United States Patent
Hochrieser et al.

(10) Patent No.: US 10,606,993 B2
(45) Date of Patent: Mar. 31, 2020

(54) AUTHENTICATION USING FACIAL IMAGE COMPARISON

(71) Applicant: Jumio Corporation, Palo Alto, CA (US)

(72) Inventors: Reinhard Hochrieser, Linz (AT); Lukas Danzer, Maria Anzbach (AT); Lukas Bayer, Vienna (AT)

(73) Assignee: Jumio Corporation, Palo Alto, CA (US)

( * ) Notice: Subject to any disclaimer, the term of this patent is extended or adjusted under 35 U.S.C. 154(b) by 128 days.

(21) Appl. No.: 15/673,324

(22) Filed: Aug. 9, 2017

(65) Prior Publication Data

US 2019/0050546 A1     Feb. 14, 2019

(51) Int. Cl.
  *G06F 21/32*    (2013.01)
  *G06K 9/00*    (2006.01)
  *H04L 29/06*    (2006.01)

(52) U.S. Cl.
  CPC ......... *G06F 21/32* (2013.01); *G06K 9/00221* (2013.01); *G06K 9/00288* (2013.01);
  (Continued)

(58) Field of Classification Search
  CPC ................ G06F 21/32; G06K 9/00221; G06K 9/00288; G06K 9/00892; H04L 63/0861
  (Continued)

(56) References Cited

U.S. PATENT DOCUMENTS

| 5,930,767 A | 7/1999 | Reber et al. |
| 6,363,380 B1 | 3/2002 | Dimitrova |

(Continued)

FOREIGN PATENT DOCUMENTS

| EP | 2048615 A1 | 4/2009 |
| JP | 2005284565 A | 10/2005 |

(Continued)

OTHER PUBLICATIONS

Anonymous: "How to Authenticate Credit Cards in Face-to-Face Transactions," Jul. 2, 2011, retrieved from the Internet: http://web.archive.org/web/20120720084453/htto://, 6 pgs.

(Continued)

*Primary Examiner* — Dant B Shaifer Harriman
(74) *Attorney, Agent, or Firm* — Morgan, Lewis & Bockius LLP

(57) ABSTRACT

Computer systems and methods are provided for transmitting authorization information to an image capturing device. A computing system receives, from an image capturing device, captured image data that includes a first facial image and an image of a document that includes a second facial image. The first facial image and the second facial image are included a single image frame. The captured image data is analyzed to determine a first portion of the captured image data that corresponds to the first facial image and a second portion of the captured image data that corresponds to the second facial image. The first portion of the captured image data is compared with the second portion of the captured image data. In accordance with a determination that the first facial image and the second facial image meet matching criteria, authorization information is transmitted to the image capturing device.

30 Claims, 20 Drawing Sheets

(52) U.S. Cl.
CPC ..... *G06K 9/00906* (2013.01); *G06K 9/00892* (2013.01); *G06K 9/00912* (2013.01); *H04L 63/0861* (2013.01)

(58) Field of Classification Search
USPC .......................................................... 713/186
See application file for complete search history.

(56) References Cited

U.S. PATENT DOCUMENTS

| | | | |
|---|---|---|---|
| 6,726,094 | B1 | 4/2004 | Rantze et al. |
| 7,912,785 | B1 | 3/2011 | Kay |
| 7,953,671 | B2 | 5/2011 | Bishop et al. |
| 7,978,900 | B2 | 7/2011 | Nepomniachtchi et al. |
| 8,189,664 | B2 | 5/2012 | Socek et al. |
| 8,543,823 | B2 | 9/2013 | Carr et al. |
| 8,688,579 | B1 | 4/2014 | Ethington et al. |
| 9,449,217 | B1 | 9/2016 | Thirimachos et al. |
| 9,584,510 | B2* | 2/2017 | Stuntebeck ........ G06K 9/00281 |
| 2003/0018897 | A1* | 1/2003 | Bellis, Jr. ............ G06Q 20/341 713/182 |
| 2005/0156046 | A1 | 7/2005 | Goldenberg |
| 2008/0306839 | A1 | 12/2008 | Starrs |
| 2009/0092294 | A1* | 4/2009 | Uchida .................. G06F 21/32 382/118 |
| 2010/0008535 | A1 | 1/2010 | Abulafia et al. |
| 2010/0048242 | A1 | 2/2010 | Rhoads et al. |
| 2010/0150458 | A1 | 6/2010 | Angell et al. |
| 2011/0313918 | A1 | 12/2011 | Lawson et al. |
| 2012/0230577 | A1 | 9/2012 | Calman et al. |
| 2013/0024300 | A1 | 1/2013 | Choudhuri et al. |
| 2013/0085935 | A1 | 4/2013 | Nepomniachtchi et al. |
| 2013/0335554 | A1 | 12/2013 | Brunner et al. |
| 2014/0020058 | A1* | 1/2014 | White ..................... G06F 21/36 726/2 |
| 2014/0254891 | A1 | 9/2014 | Deok et al. |
| 2015/0046711 | A1* | 2/2015 | Slaby ...................... H04L 63/08 713/170 |
| 2015/0319170 | A1* | 11/2015 | Grossemy ............... G06F 21/31 713/186 |
| 2015/0365361 | A1* | 12/2015 | Tomlinson .............. H04L 51/04 709/206 |
| 2016/0063235 | A1* | 3/2016 | Tussy ...................... G06F 21/32 726/6 |
| 2016/0162729 | A1 | 6/2016 | Hagen et al. |
| 2017/0019400 | A1* | 1/2017 | Drolshagen ......... H04L 63/0861 |
| 2017/0124386 | A1* | 5/2017 | Long .................. G06K 9/00228 |
| 2018/0182057 | A1* | 6/2018 | Corcoran ........... G06K 9/00899 |

FOREIGN PATENT DOCUMENTS

| | | |
|---|---|---|
| KR | 10-1472845 B1 | 12/2014 |
| KR | 10-1680598 B1 | 12/2016 |
| KR | 10-2017-0029301 A | 3/2017 |
| WO | WO2017-043314 A1 | 3/2017 |

OTHER PUBLICATIONS

Anonymous: "Merchant Tips & FACQs," Oct. 7, 2008, retrieved from the Internet: http://web.archive.org/web/20081007232740/http://www.usbank.com/cgi_w/cfm/small_business/products_and_services/merchant_payment/merchant_faqs.cfm, 5 pgs.
Communication Pursuant to Rules 161(2) and 162 EPC, EP13753752.8, dated Mar. 24, 2015, 3 pgs.
Communication Pursuant to Rules 70(2) and 70a(2) EPC, EP13753752.8, dated Mar. 15, 2016, 1 pg.
Jumio Inc., Extended European Search Report, EP13753752.8, dated Feb. 26, 2016, 8 pgs.
Jumio Inc., Communication Pursuant to Article 94(3) EP13753752.8, dated Feb. 14, 2017, 7 pgs.
Jumio Inc., International Search Report and Written Opinion, PCT/US2013/055195, dated Mar. 6, 2014, 9 pgs.
Jumio Inc., International Preliminary Report on Patentability, PCT/US2013/055195, dated Feb. 26, 2015,8 pgs.
Ryan Kim, "Gigaom/Junio says use your webcam to swipe credit cards," Jul. 26, 2011, retrieved from the Internet: https://gigaom.com/2011/07/26/jumio-says-use-your-webcam-to-swipe-credit-cards/, 6 pgs.
Diez, Patricia, "Digital Identification by Drone—Electronic Identification," Jul. 5, 2016, URL:https://www.electronicid.eu/identification-digital-or-dron/.
Diez, Patricia, "Why is Video Identification more secure than Face-to-Face Identification?," May 3, 2017, URL:https://www.electronicid.eu/video-identificaton-vid-secure-face-face-identification/.
Grassi, Paul A. et al., "Digital Identity Guidelines," National Institute of Stadards and Technology, Jun. 22, 2017, retrieved from https://nvlpubs.nist.gov/nistpubs/Special Publicatios/NIST.SP.800-63-3.pdf.
Grassi, Paul A. et al., "Digital Identity Gudelines: Enrollment and Identity Proofing," National Institute of Standards and Tehcnology, Jun. 22, 2017, retrieved from https://nvlpubls.nist.gov/nistpubs/SpecialPublications/NIST.SP.800-63A.pdf.
Grassi, Paul A. et al., "Digital Identity Guidelines: Authentication and Lifecycle Management," National Institute of Standards and Technology, Jun. 22, 2017, retrieved from https://nvlpubs.nist.gov/nistpubs/Special Publications/NIST.SP.800-63b.pdf.
Grassi, Paul A. et al., "Digital Identity Guidelines: Federation and Assertions," National Institue of Standards and Techology, Jun. 22, 2017, retrieve from https://nvlpubs.nist.gov/nistpubs/SpecialPublications/NIST/SP.800-63C.pdf.
Jumio Inc., Extended European Search Report, EP18187949.5, dated Apr. 3, 2019, 12 pgs.
Jumio Inc., International Search Report and Written Opinion, PCT/US2018045839, dated Dec. 31, 2018, 12 pgs.

* cited by examiner t=t₀ t=t₀

1300 (cont.)

1318
Receive, from an image capturing device, captured image data that includes a first facial image and an image of a document that includes a second facial image, wherein the first facial image and the image of the document that includes the second facial image are included a single image frame

1320
The captured image data includes an image frame

1322
The captured image data includes a video stream

1324
The image of the document that includes the second facial image includes second facial image location cue information and determining the second portion of the captured image data that corresponds to the second facial image includes determining a location of the facial image location cue information

1326
Analyze the captured image data to determine a first portion of the captured image data that corresponds to the first facial image and a second portion of the captured image data that corresponds to the second facial image

1328
Analyzing the captured data to determine the first portion of the captured image data that corresponds to the first facial image includes determining, in a plurality of image frames, a respective portion of a respective image frame that corresponds to the first facial image

1330
Analyzing the captured data to determine the first portion of the captured image data that corresponds to the first facial image includes generating the first portion by compositing a plurality of respective portions of respective image frames from the plurality of image frames that correspond to the first facial image

1332
Analyzing the captured data to determine the first portion of the captured image data that corresponds to the first facial image includes selecting, using the second portion of the captured image data that corresponds to the second facial image, a respective portion of a respective image frame that corresponds to the first facial image.

1338
Determine whether the first facial image and the second facial image meet matching criteria by comparing the first portion of the captured image data with the second portion of the captured image data

1340
Determining whether the first facial image and the second facial image meet matching criteria includes at least one of: comparing the first portion of the captured image data with image data that corresponds to a stored facial image; or comparing the second portion of the captured image data with image data that corresponds to the stored facial image

1342
In accordance with a determination that the first facial image and the second facial image meet the matching criteria, transmit authorization information to the image capturing device

1344
In accordance with a determination that the first facial image and the second facial image do not meet the matching criteria, transmit authorization denial information to the image capturing device

1346
In accordance with a determination that the first facial image and the second facial image do not meet the matching criteria, transmit, to the image capturing device, a facial position adjustment request.

AUTHENTICATION USING FACIAL IMAGE COMPARISON

CROSS-REFERENCE TO RELATED APPLICATIONS

This application is related to U.S. patent application Ser. No. 13/968,164, filed Aug. 15, 2013, entitled "Image Processing for Credit Card Validation," and U.S. Provisional Patent Application No. 61/683,623, filed Aug. 15, 2012, entitled "Image Processing for Credit Card Validation," each of which is hereby incorporated by reference in its entirety.

TECHNICAL FIELD

This application relates generally to user authentication, and more particularly, to using facial image data for user authentication.

BACKGROUND

User authentication is often performed prior to granting user access to a system. Typically, user authentication involves accessing previously stored user information, such as user identification information and/or user biometric data, and comparing the previously stored user information with information that a user provides in connection with an access request. Systems that perform user authentication store user information in a data storage device. Prior to requesting authorization, users enroll with the system by providing user information to be stored.

SUMMARY

Some authentication systems described herein perform authentication using a captured image that includes a person's face and a document that includes a previously captured image of the person's face. For example, while the person is holding an identification document, such as a driver's license, that includes a previously captured photograph of the person's face, an image is captured such that the person's face and the identification document are both visible in the image. Image analysis is performed on the image to determine whether the person's face in the image matches the facial image on the identification document. If the image analysis determines that there is a match, authorization is granted. In this way, a device is enabled to perform authentication using a received image without relying on access to user information obtained and stored prior to receiving the image.

In some embodiments, a method is performed at a server system including one or more processors and memory storing one or more programs for execution by the one or more processors. The method includes receiving, from an image capturing device, captured image data that includes: a first facial image and an image of a document that includes a second facial image. The first facial image and the image of the document that includes the second facial image are included a single image frame. The captured image data is analyzed to determine a first portion of the captured image data that corresponds to the first facial image and a second portion of the captured image data that corresponds to the second facial image. The method additionally includes determining whether the first facial image and the second facial image meet matching criteria by comparing the first portion of the captured image data with the second portion of the captured image data. In accordance with a determination that the first facial image and the second facial image meet the matching criteria, authorization information is transmitted to the image capturing device.

In some embodiments, a system includes one or more processors, memory, and one or more programs. The one or more programs are stored in the memory and configured to be executed by the one or more processors. The one or more programs include instructions for receiving, from an image capturing device, captured image data that includes a first facial image and an image of the document that includes a second facial image. The first facial image and the image of the document that includes the second facial image are included a single image frame. The one or more programs additionally include instructions for analyzing the captured image data to determine a first portion of the captured image data that corresponds to the first facial image and a second portion of the captured image data that corresponds to the second facial image. The one or more programs additionally include instructions for determining whether the first facial image and the second facial image meet matching criteria by comparing the first portion of the captured image data with the second portion of the captured image data. The one or more programs additionally include instructions for, in accordance with a determination that the first facial image and the second facial image meet the matching criteria, transmitting authorization information to the image capturing device.

In some embodiments, a computer readable storage medium stores one or more programs. The one or more programs comprise instructions, which when executed, cause a device to receive, from an image capturing device, captured image data that includes a first facial image and an image of the document that includes a second facial image. The first facial image and the image of the document that includes the second facial image are included a single image frame. The one or more programs additionally cause the device to analyze the captured image data to determine a first portion of the captured image data that corresponds to the first facial image and a second portion of the captured image data that corresponds to the second facial image. The one or more programs additionally cause the device to determine whether the first facial image and the second facial image meet matching criteria by comparing the first portion of the captured image data with the second portion of the captured image data. The one or more programs additionally cause the device to, in accordance with a determination that the first facial image and the second facial image meet the matching criteria, transmit authorization information to the image capturing device.

BRIEF DESCRIPTION OF THE DRAWINGS

So that the present disclosure can be understood in greater detail, features of various embodiments are illustrated in the appended drawings. The appended drawings, however, merely illustrate pertinent features of the present disclosure and are therefore not limiting.

FIGS. 13A-13H are flow diagrams illustrating a method for authenticating a user using facial image comparison, in accordance with some embodiments.

In accordance with common practice, some of the drawings may not depict all of the components of a given system, method, or device. Finally, like reference numerals denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

Figure 1:
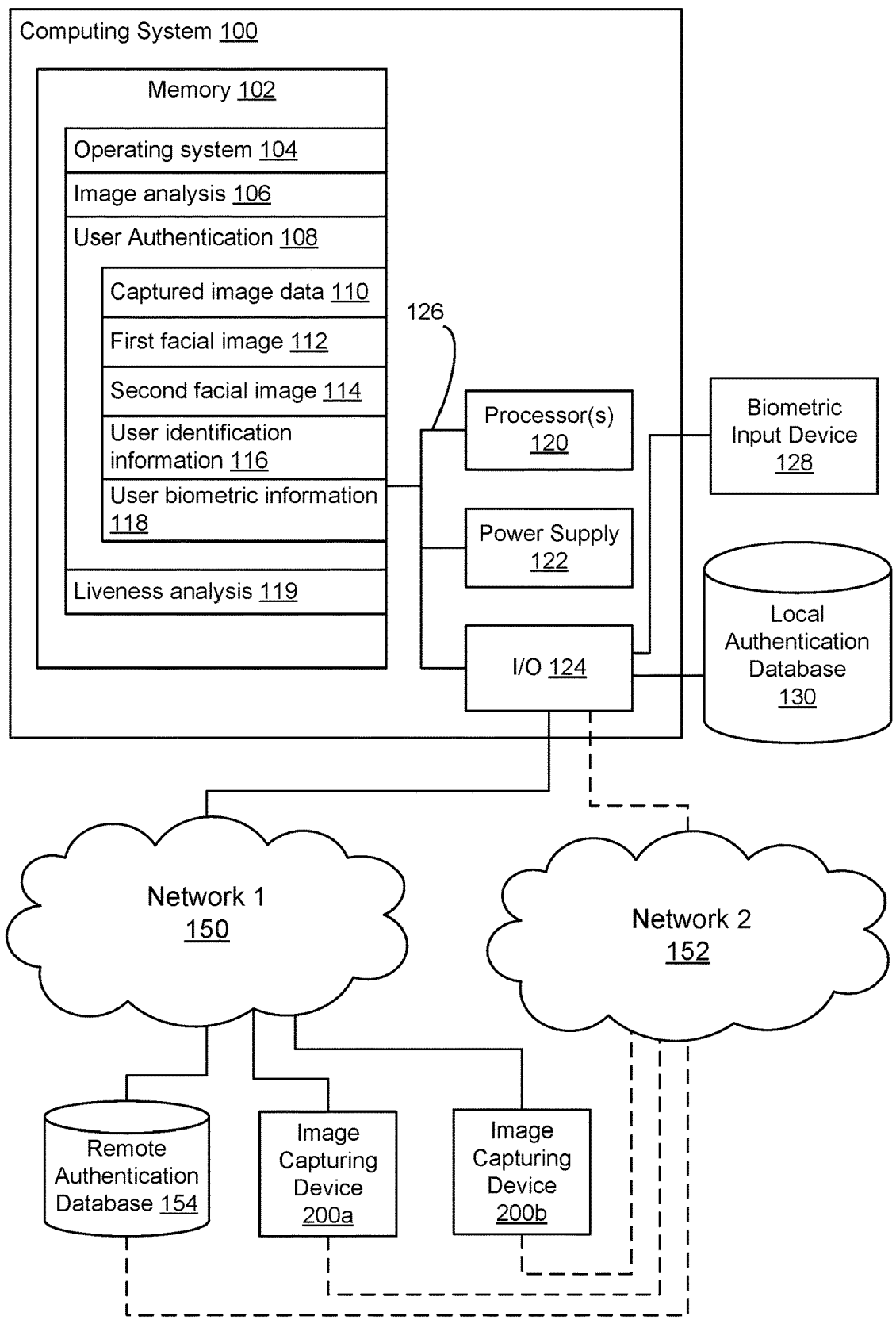
FIG. 1 is a system diagram of a computing system and its context, in accordance with some embodiments.

FIG. 1 is a system diagram of a computing system 100, in accordance with some embodiments. The computing system 100 is, for example, a server computer, a desktop computer, or a laptop computer. The computing system 100 typically includes a memory 102, one or more processor(s) 120, a power supply 122, an input/output (I/O) subsystem 124, and a communication bus 126 for interconnecting these components.

The processor(s) 120 execute modules, programs, and/or instructions stored in the memory 102 and thereby perform processing operations.

In some embodiments, the memory 102 stores one or more programs (e.g., sets of instructions) and/or data structures, collectively referred to as "modules" herein. In some embodiments, the memory 102, or the non-transitory computer readable storage medium of the memory 102 stores the following programs, modules, and data structures, or a subset or superset thereof:

an operating system 104;
an image analysis module 106;
a user authentication module 108, which stores information such as captured image data 110, extracted first facial image data 112, and/or extracted second facial image data 114 (e.g., extracted by the image analysis module 106 from the captured image data 110), user identification information 116 (e.g., user name, user password, user residential information, user phone number, user date of birth, and/or user e-mail), and user biometric information 118 (e.g., facial data, fingerprint data, retinal data, hand image data, and/or gait data); and liveness analysis module 119, which stores information for displaying a moving target liveness user interface 800 and/or a language content liveness user interface 1100, generates audio output including facial movement instructions and/or language content, stores verification data (e.g., facial feature position data, audio print data that corresponds to language content output, and/or facial image data that corresponds to language content output), and/or uses an audio analysis module to perform audio analysis.

The above identified modules (e.g., data structures, and/or programs including sets of instructions) need not be implemented as separate software programs, procedures, or modules, and thus various subsets of these modules may be combined or otherwise re-arranged in various embodiments. In some embodiments, the memory 102 stores a subset of the modules identified above. In some embodiments, a remote authentication database 154 and/or a local authentication database 130 store one or more modules identified above. Furthermore, the memory 102 may store additional modules not described above. In some embodiments, the modules stored in the memory 102, or a non-transitory computer readable storage medium of the memory 102, provide instructions for implementing respective operations in the methods described below. In some embodiments, some or all of these modules may be implemented with specialized hardware circuits that subsume part or all of the module functionality. One or more of the above identified elements may be executed by one or more of the processor(s) 120. In some embodiments, one or more of the modules described with regard to the memory 102 is implemented in the memory 202 of an image capturing device 200 (FIG. 2) and executed by the processor(s) 220 of the image capturing device 200.

In some embodiments, the I/O subsystem 124 communicatively couples the computing system 100 to one or more local devices, such as a biometric input device 128 and/or a local authentication database 130, via a wired and/or wireless connection. In some embodiments, the I/O subsystem 124 communicatively couples the computing system 100 to one or more remote devices, such as a remote authentication database 154, a first image capturing device 200a, and/or a second image capturing device 200b, via a first communications network 150, a second communications network 152, and/or via a wired and/or wireless connection. In some embodiments, the first communications network 150 is the Internet. In some embodiments, the first communication network 150 is a first financial network and the second communication network 152 is a second financial network.

In some embodiments, a biometric input device 128 (e.g., a fingerprint scanner, a retinal scanner, and/or a camera) is communicatively coupled to the computing system 100. For example, the computing system 100 is located in or near to an authentication kiosk, or is communicatively coupled to an authentication kiosk that includes the biometric input device 128.

The communication bus 126 optionally includes circuitry (sometimes called a chipset) that interconnects and controls communications between system components.

Figure 2:
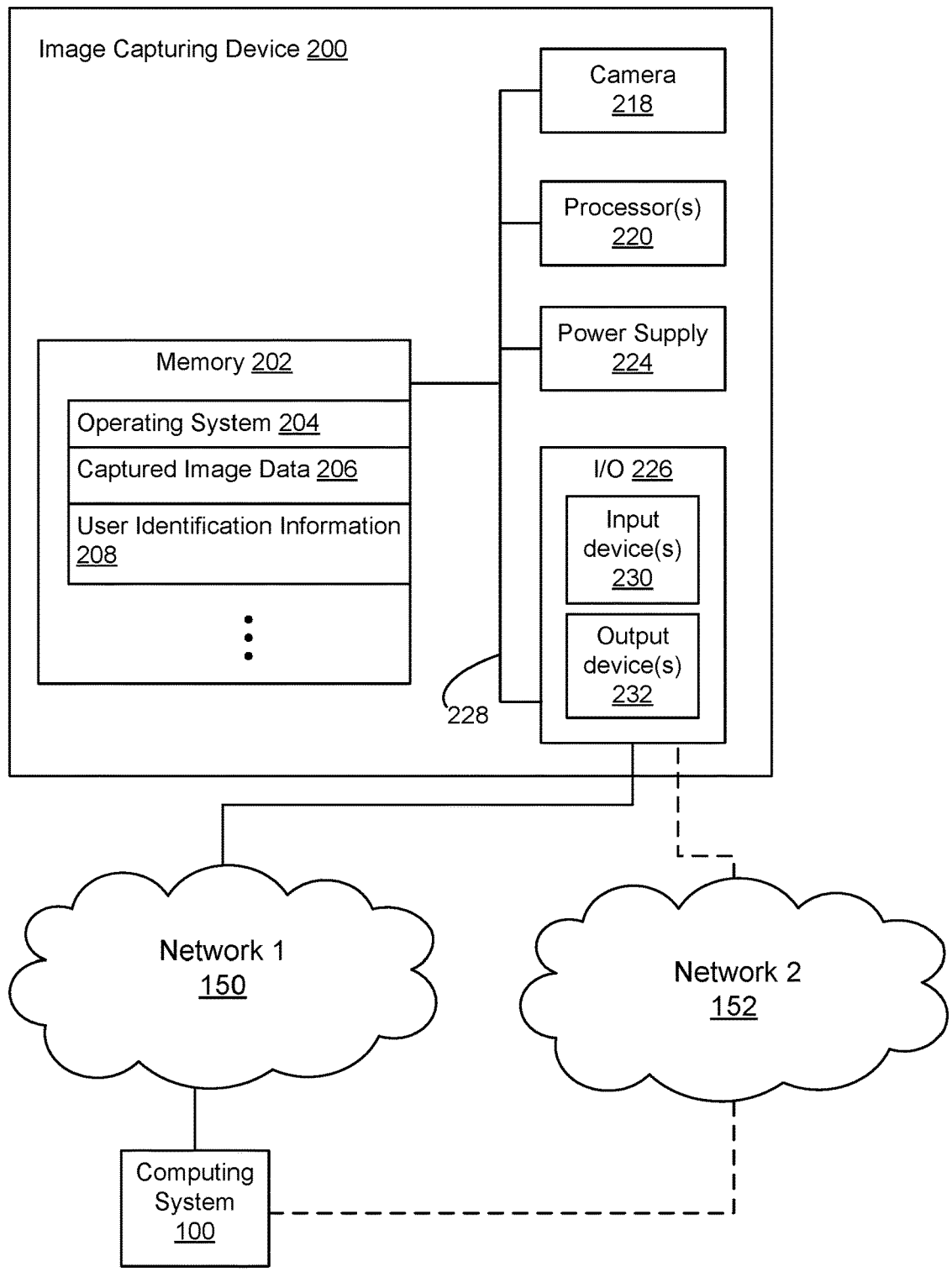
FIG. 2 is a system diagram of an image capturing device, in accordance with some embodiments.

FIG. 2 is a system diagram of an image capturing device 200 (e.g., the first or second image capturing devices 200a or 200b), in accordance with some embodiments. The image capturing device 200 typically includes a memory 202, a camera 218, one or more processor(s) 220, a power supply 224, an input/output (I/O) subsystem 226, and a communication bus 228 for interconnecting these components. The image capturing device 200 is, for example, a mobile phone, a tablet, a digital camera, a laptop computer or other computing device, or a kiosk.

The processor(s) 220 execute modules, programs, and/or instructions stored in the memory 202 and thereby perform processing operations.

In some embodiments, the memory 202 stores one or more programs (e.g., sets of instructions) and/or data structures, collectively referred to as "modules" herein. In some embodiments, the memory 202, or the non-transitory computer readable storage medium of the memory 202 stores the following programs, modules, and data structures, or a subset or superset thereof:
  an operating system 204;
  captured image data 206 (e.g., image data captured by the camera 218, such as video and/or still images); and
  user identification information 208 (e.g., user name, user password, user residential information, user phone number, user date of birth, and/or user e-mail address).

The above identified modules (e.g., data structures, and/or programs including sets of instructions) need not be implemented as separate software programs, procedures, or modules, and thus various subsets of these modules may be combined or otherwise re-arranged in various embodiments. In some embodiments, the memory 202 stores a subset of the modules identified above. In some embodiments, the camera 218 stores one or more modules identified above (e.g., captured image data 206). Furthermore, the memory 202 may store additional modules not described above. In some embodiments, the modules stored in the memory 202, or a non-transitory computer readable storage medium of the memory 202, provide instructions for implementing respective operations in the methods described below. In some embodiments, some or all of these modules may be implemented with specialized hardware circuits that subsume part or all of the module functionality. One or more of the above identified elements may be executed by one or more of the processor(s) 220. In some embodiments, one or more of the modules described with regard to the memory 202 is implemented in the memory 102 of the computing system 100 and executed by processor(s) 120 of the computing system 100.

The camera 218 captures still images, sequences of images, and/or video. In some embodiments, the camera 218 is a digital camera that includes an image sensor and one or more optical devices. The image sensor is, for example, a charge-coupled device or other pixel sensor that detects light. In some embodiments, one or more optical devices are movable relative to the image sensor by an imaging device actuator. The one or more optical devices affect the focus of light that arrives at the image sensor and/or an image zoom property.

In some embodiments, the image capturing device 200 includes a camera 218 (e.g., the camera 218 is located within a housing of the image capturing device 200). In some embodiments, the camera 218 is a peripheral device that captures images and sends captured image data 206 to the I/O subsystem 226 of the image capturing device 200 via a wired and/or wireless communication connection.

In some embodiments, the I/O subsystem 226 communicatively couples image capturing device 200 to one or more remote devices, such as a computing system 100, via a first communication network 150 and/or a second communication network 152.

In some embodiments, a user input device 230 and/or an output device 232 are integrated with the image capturing device 200 (e.g., as a touchscreen display). In some embodiments, a user input device 230 and/or an output device 232 are peripheral devices communicatively connected to an image capturing device 200. In some embodiments, a user input device 230 includes a microphone, a keyboard, and/or a pointer device such as a mouse, a touchpad, a touchscreen, and/or a stylus. In some embodiments, the output device 232 includes a display (e.g., a touchscreen display that includes input device 230) and/or a speaker.

The communication bus 228 optionally includes circuitry (sometimes called a chipset) that interconnects and controls communications between system components.

In some embodiments, one or more user input devices and/or output devices (not shown), such as a display, touchscreen display, speaker, microphone, keypad, pointer control, zoom adjustment control, focus adjustment control, and/or exposure level adjustment control, are integrated with the device 200.

Figure 3:
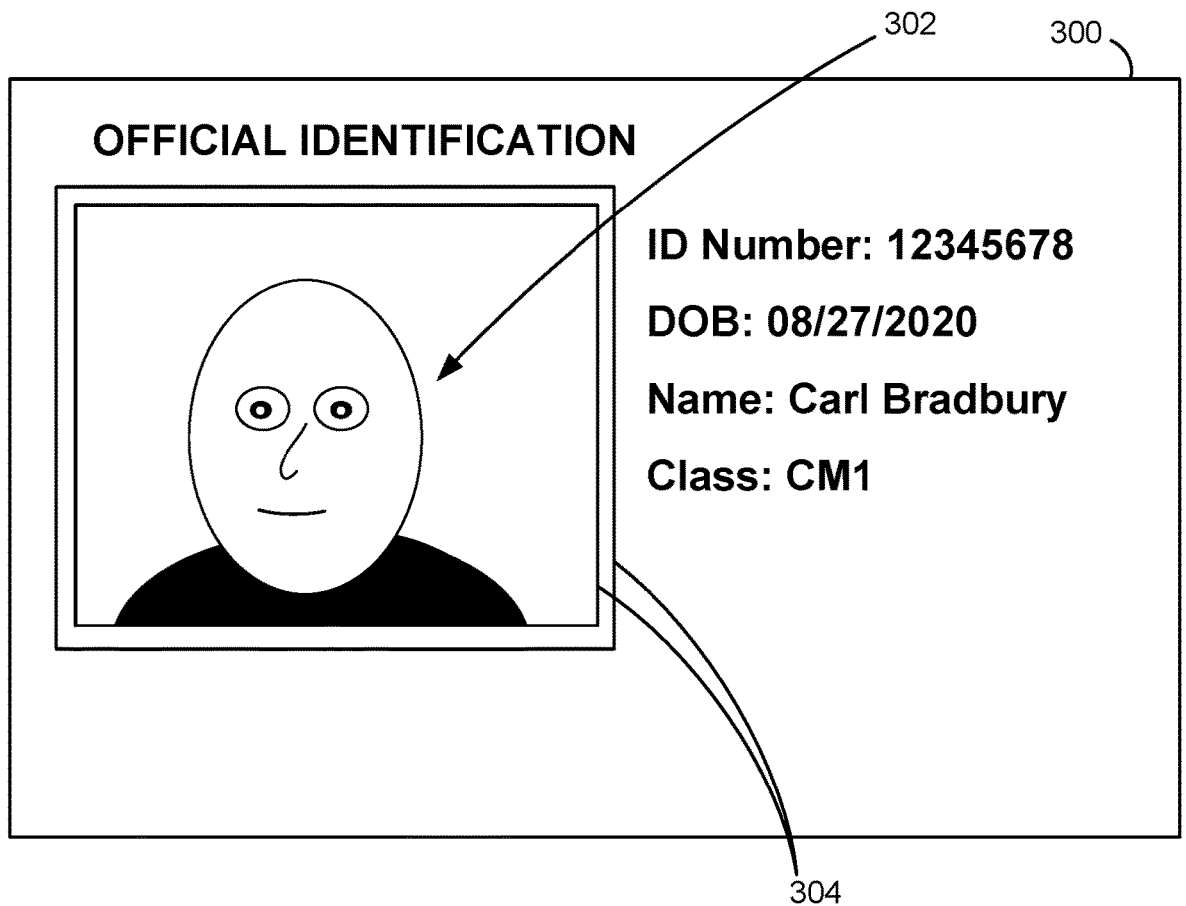
FIG. 3 illustrates a document that includes a facial image, in accordance with some embodiments.

FIG. 3 illustrates a document 300 that includes a facial image 302, in accordance with some embodiments. The document 300 is, for example, an identification card, a driver's license, a passport, a financial instrument (e.g., credit card or debit card), a facility access card, and/or a photograph.

In some embodiments, the document 300 includes facial image location cue information (e.g., the concentric rectangles indicated at 304). Facial image location cue information 304 is a visual indication on the document 300 of a location of the facial image 302 within the document 300. For example, the concentric rectangles 304 that surround facial image 302 provide a cue to indicate the location of the facial image 302 within the document 300. In some embodiments, facial image location cue information includes one or more marks and/or pointers. For example, facial image location cue information indicates a facial image area that is smaller than the full area of the document 300 and that includes the facial image 302, such as a perimeter that indicates boundaries of the facial image 302 or otherwise surrounds a facial image 302. In some embodiments, a facial image location cue is a background surrounding a facial image 302 (e.g., a background that has a predefined color and/or pattern). In some embodiments, a facial image location cue includes a material and/or texture of the facial image area of the document 300 that is different from a material and/or texture of the remainder of the document 300.

Figure 4:
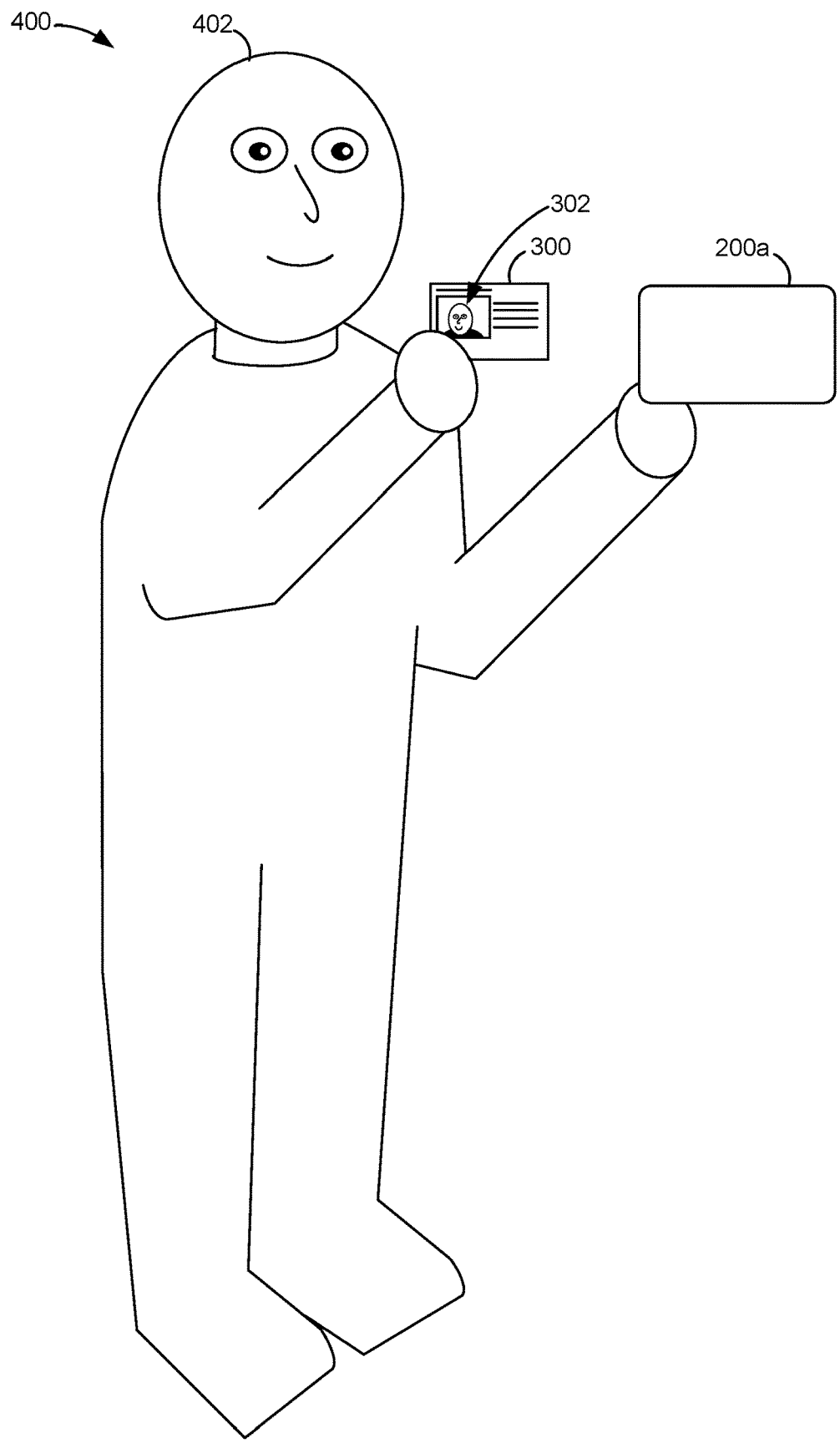
FIGS. 4 and 5 illustrate image capture environments, in accordance with some embodiments.

FIG. 4 illustrates an image capture environment 400, in accordance with some embodiments. In FIG. 4, a person 402 is presenting a document 300 (e.g., the person's driver's license) in one hand and an image capturing device 200a (e.g., a mobile device) in the other hand. The document 300 includes a previously captured photograph of a facial image 302 of the person 402. The image capturing device 200a is used to capture an image of the face of person 402 and of the document 300 that includes the facial image 302 of the person 402. In some embodiments, the camera 218 is a front-facing camera of the image capturing device 200*a*, allowing the person 402 to adjust imaging properties of the camera 218 (e.g., a position and/or zoom level of the camera 218) while viewing the output of the camera 218 on a display (e.g., an output device 232) of the image capturing device 200*a* to ensure that the document 300 and the face of the person 402 are both visible in an image frame captured by the camera 218.

Figure 5:
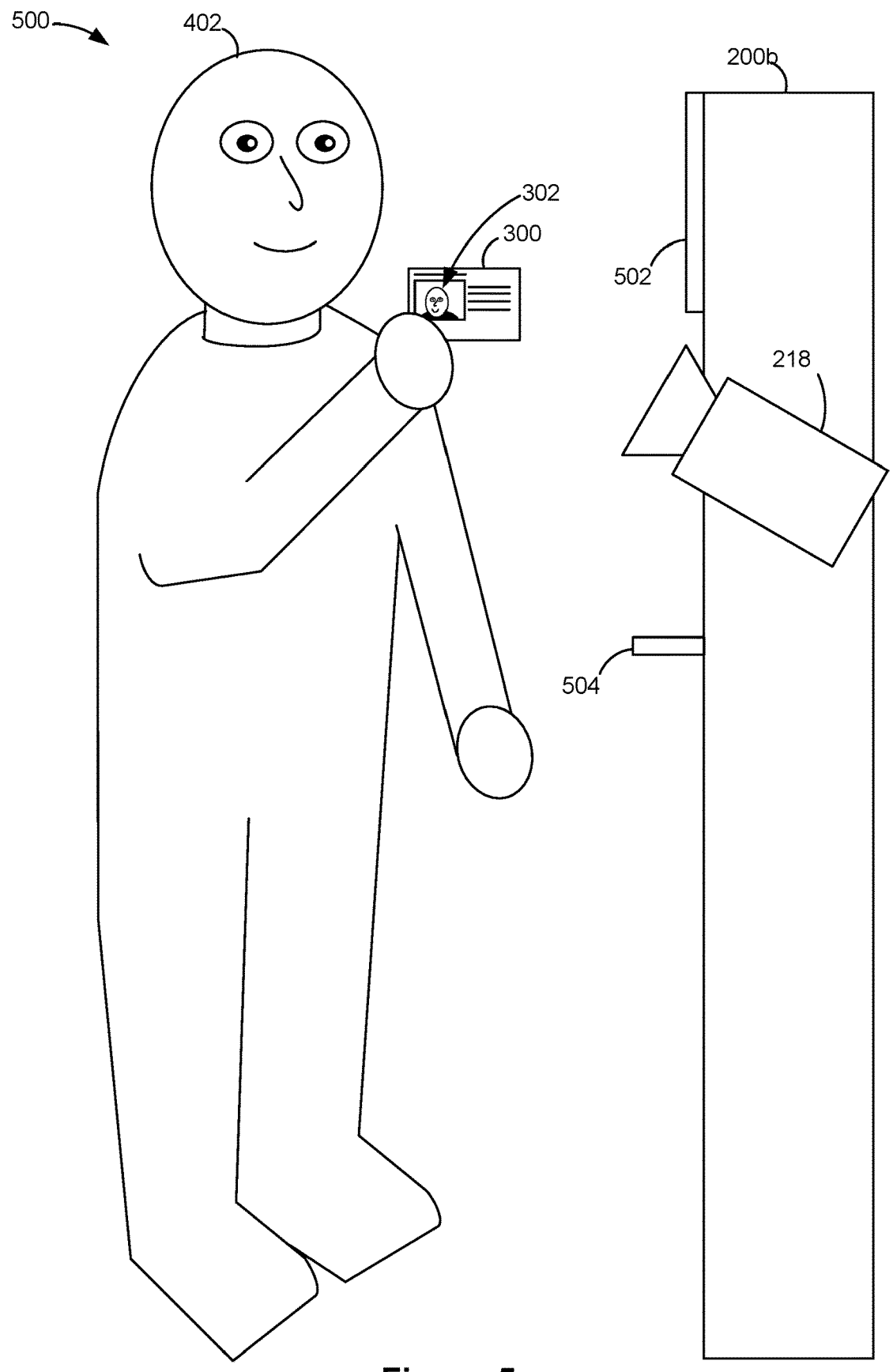

FIG. 5 illustrates an image capture environment 500, in accordance with some embodiments. In FIG. 5, the image capturing device 200*b* is a kiosk (or a component of a kiosk). The kiosk 200*b* is, for example, a security kiosk (e.g., for gaining entrance to an entertainment venue, an office, and/or a travel destination) or a commercial kiosk (e.g., a registration and/or check-out device for a commercial establishment such as a store or hotel). The kiosk 200*b* includes a camera 218 that captures an image in which the face of the person 402 and the document 300, which includes a previously captured photograph that includes facial image 302 of the person 402, are both visible in a captured image frame. In some embodiments, the kiosk 200*b* includes one or more user input devices 230 and/or output devices 232.

Figure 6A:
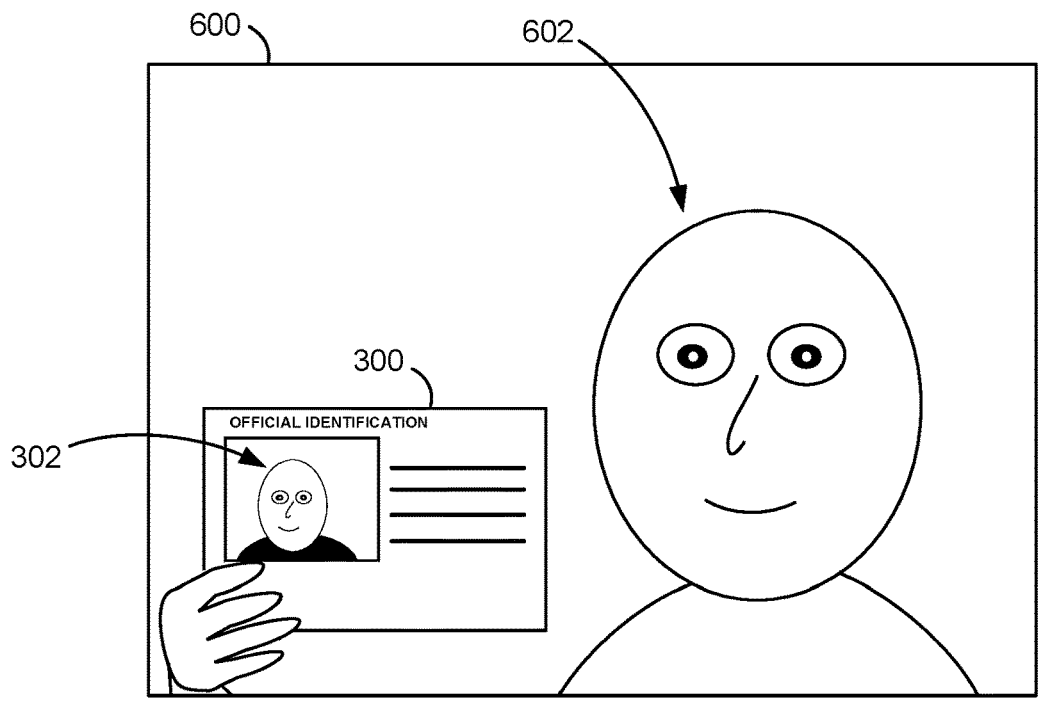
FIGS. 6A, 6B, 7A, and 7B illustrate captured images that include a first facial image and an image of a document that includes a second facial image, in accordance with some embodiments.

FIG. 6A illustrates a captured image 600 that includes a first facial image 602 of a person 402 (FIGS. 4 and 5) and an image of a document 300 that includes a second facial image 302, in accordance with some embodiments. The captured image 600 is generated by an image capturing device 200 such as the first image capturing device 200*a* as described with regard to FIG. 4 or the second image capturing device 200*b* as described with regard to FIG. 5. In some embodiments, the captured image 600 is an image frame from a video sequence. In some embodiments, the captured image 600 is an image frame captured as a single still image.

Figure 6B:
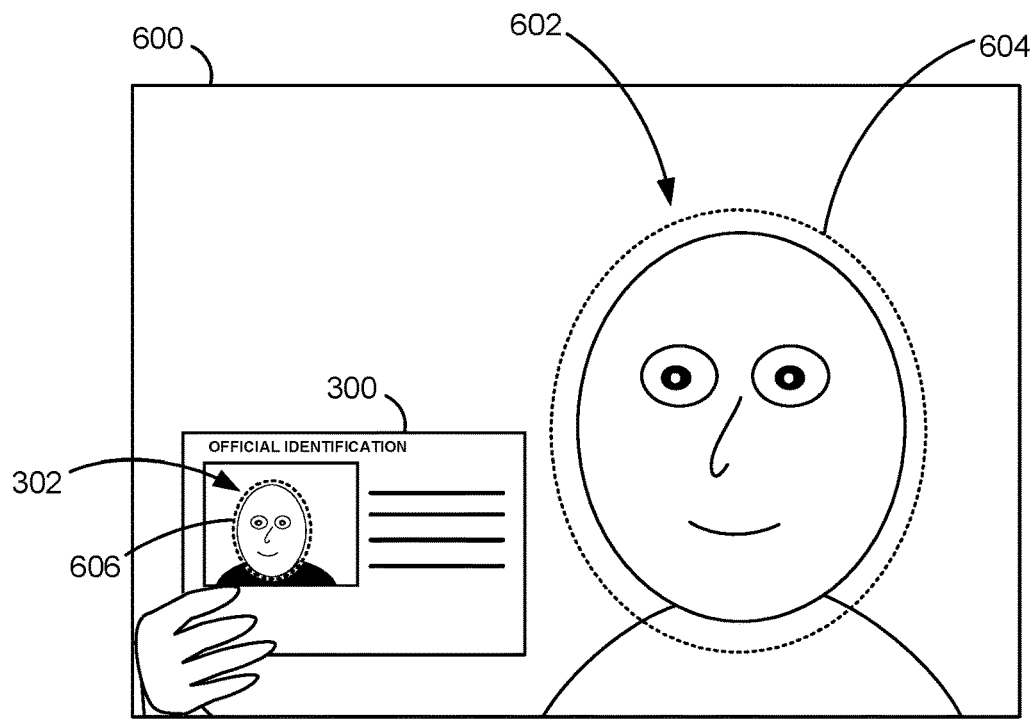

In FIG. 6B, a captured image 600 is shown annotated with a first region marker 604 indicating a portion of the captured image 600 that corresponds to a facial image 602 and a second region marker 606 indicating a portion of the image 600 that corresponds to a facial image 302 in the document 300. For example, when the captured image 600 has been received by a computing system 100, region markers 604 and 606 indicate portions of the image 600 that correspond to facial images 602 and 302, respectively, as determined by the image analysis module 106. While the illustrative regions indicated in FIG. 6B are ovals, it will be recognized that the portion of the image 600 that corresponds to the facial image 602 and/or the portion of the image 600 that corresponds to the facial image 302 in the document 300 may be rectangular regions, circular regions, polygonal regions, and/or regions that conform to detected outlines of the facial images 302 and 602. "Facial image," as used herein, refers to a face of a person 402, a portion of a face of the person 402, and/or a face and other parts of the body of the person 402 (e.g., the face and the person's shoulders or the person's entire body).

Figure 7A:
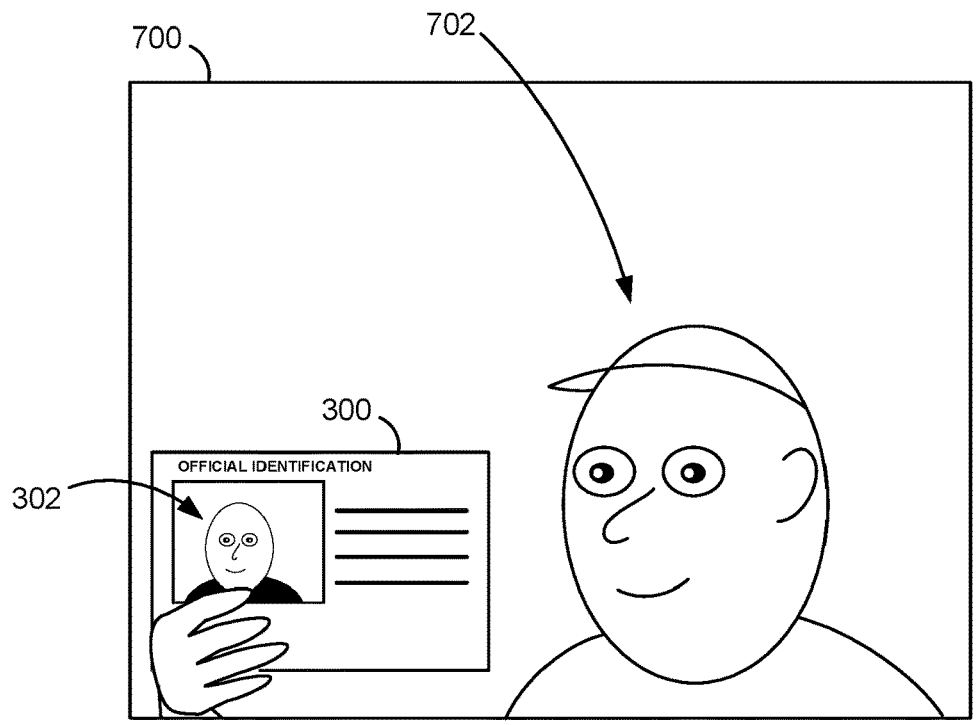
Figure 7B:
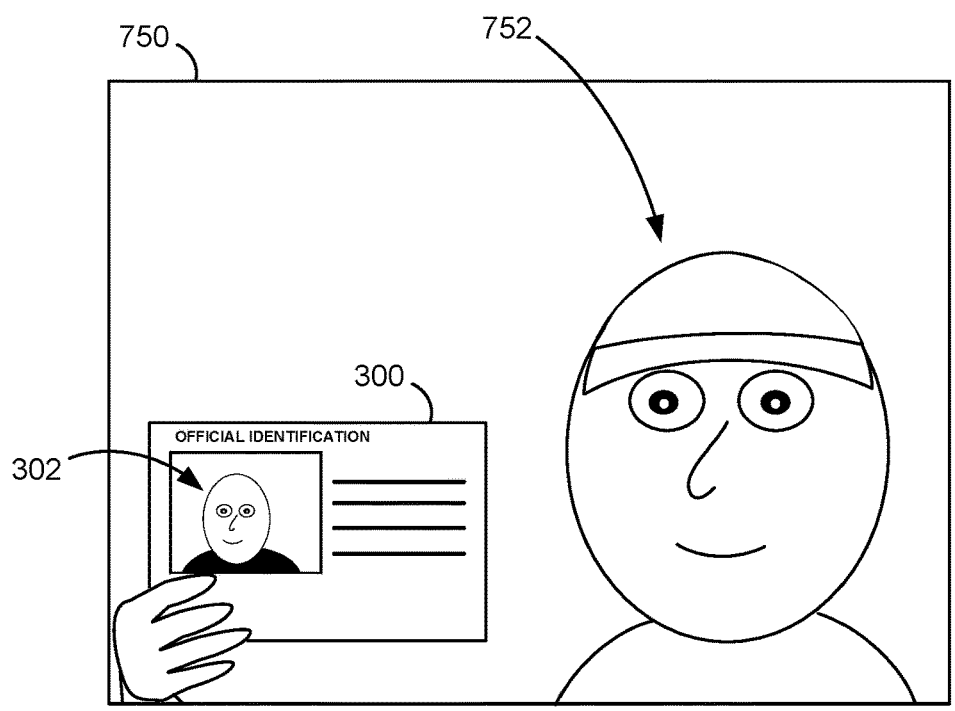

FIG. 7A shows a first captured image 700 that illustrates a first facial position 702 and FIG. 7B shows a secondcaptured image 750 that illustrates a second facial position 752, in accordance with some embodiments.

In FIG. 7A, the first image 700 shows the face of person 402 oriented toward the document 300 (turned to the person's right side). When the orientation of the face of the person 402 in the captured image 700 is different from the orientation of the face in second facial image 302, the ability of the image analysis module 106 to determine whether the first facial image matches the second facial image 302 may be impeded. In some embodiments, the image analysis module 106 is configured to determine a first facial position 702 of the first facial image (e.g., the facial image that has first facial position 702) and a facial position of the second facial image 302. In some embodiments, if the first facial position 702 is not sufficiently similar to the second facial position in the second facial image 302 for image analysis module 106 to determine whether matching criteria are met, the computing system 100 transmits a facial position matching request to the image capturing device 200.

For example, in accordance with a determination by the image analysis module 106 that a facial position adjustment is needed, the computing system 100 transmits to the image capturing device 200 a facial position adjustment request, which includes a message such as "please turn your head to the left." In some embodiments, in response to receiving the transmitted request, the image capturing device 200 displays or otherwise outputs this message (e.g., via an output device 232). In some embodiments, in response to receiving the transmitted request (e.g., subsequent to displaying the received message), image capturing device 200 captures a new image 750, as shown in FIG. 7B, and sends the new image 750 to the computing system 100. In some embodiments, the computing system 100 performs image analysis on the new image 750.

In some embodiments, determining whether a first facial image in a first facial position 702 and the second facial image meet facial position matching criteria includes determining whether a location of one or more facial features (e.g., right eye, left eye, mouth, nose, and/or other identified facial curve or protrusion) detected in the second facial image 302 are also detected in the first facial image in the first facial position 702. If the one or more facial features in the second facial image are not detected in the first facial position 702 of the first image, the computing system 100 transmits to the image capturing device 200 a facial position adjustment request (e.g., including a message such as, "please turn your head to the left," "please turn your head to the right," "please tilt your head upward," or "please tilt your head downward").

In some embodiments, determining whether a first facial image in a first facial position 702 and a second facial image meet facial position matching criteria includes determining whether a face in the first facial position 702 is at least partially obstructed (e.g., partially covered by a hat) and/or determining whether a face in the second facial image 302 is at least partially obstructed (e.g., covered by a finger). If an obstruction is detected, the computing system 100 transmits to image capturing device 200 a facial position adjustment request (e.g., including a message such as, "please remove your hat," or "please move your finger so that it is not covering the picture of your face").

FIGS. 8A-8B, 9A-9B, 10A-10B, 11A-11B, and 12A-12B illustrate user interfaces and captured images associated with liveness assessments, in accordance with some embodiments. For example a liveness assessment assesses movement of a person that occurs in response to an instruction that is displayed or output by a speaker. In some embodiments, a liveness assessment provides additional protection against unauthorized access by ensuring that the person attempting to gain authorization (e.g., the person 402 who is presenting a document 300) is a live individual capable of particular movements in response to instructions. For example, the liveness assessment is used to ensure that a still image cannot be used to gain fraudulent access to a system.

In some embodiments, the displayed instruction is randomly, pseudorandomly, or cyclically generated (e.g., so that a user must respond in real time to a prompt that is not predictable prior to the time of the access attempt). FIGS. 8A-8B, 9A-9B, and 10A-10B illustrate use of eye-tracking to for liveness assessment, and FIGS. 11A-11B, and 12A-12B illustrate use of language content in a message for liveness assessment.

Figure 8A:
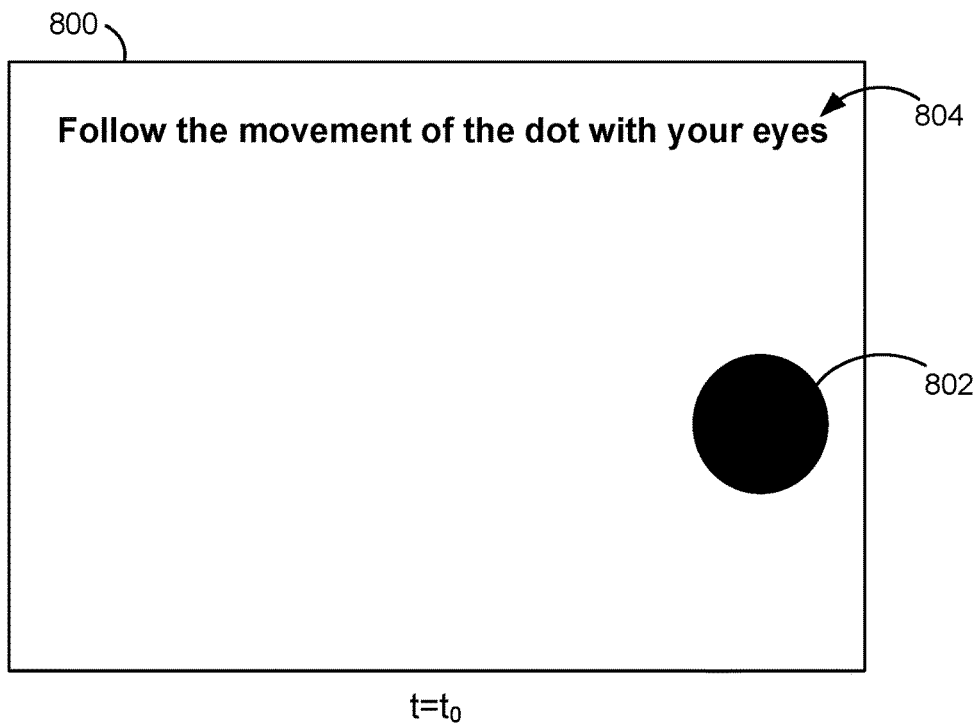
FIG. 8A illustrates a first state of a user interface that displays a moving target for liveness verification, in accordance with some embodiments.
Figure 9A:
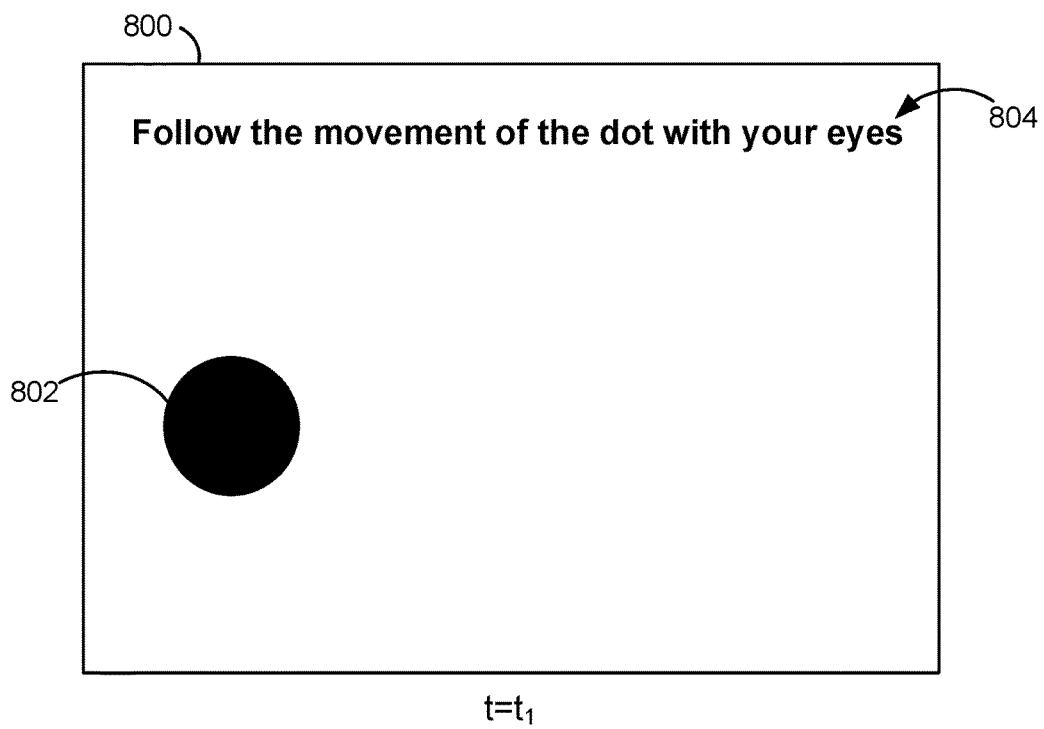
FIG. 9A illustrates a second state of a user interface that displays a moving target for liveness verification, in accordance with some embodiments.

FIGS. 8A and 9A illustrate a user interface 800 that displays a moving target 802 for liveness verification, in accordance with some embodiments. FIG. 8A illustrates a first state of the user interface 800, which is displayed at a first time ($t_0$) and FIG. 9A illustrates a second state of the user interface 800 as displayed at a second time ($t_1$), which is later than the first time. The user interface 800 is displayed by a display (e.g., an output device 232) of the image capturing device 200 (e.g., 200a or 200b). In some embodiments, the moving target 802 is an animated image, such as an animated dot. In some embodiments, the moving target 802 moves across the user interface 800 (e.g., side-to-side, as shown in FIGS. 8A and 9A, vertically, diagonally, sinusoidally, and/or along another path). In some embodiments, the path of movement of the moving target 802 is a pre-defined path, a randomly-generated path, a pseudorandomly generated path, or a path that is randomly, pseudorandomly, or cyclically selected from a pre-defined set of paths. In some embodiments, the user interface 800 displays a prompt (e.g., instructive text 804) to provide instructions to a user (e.g., the person 402) for moving a facial feature to satisfy the liveness criteria.

Figure 8B:
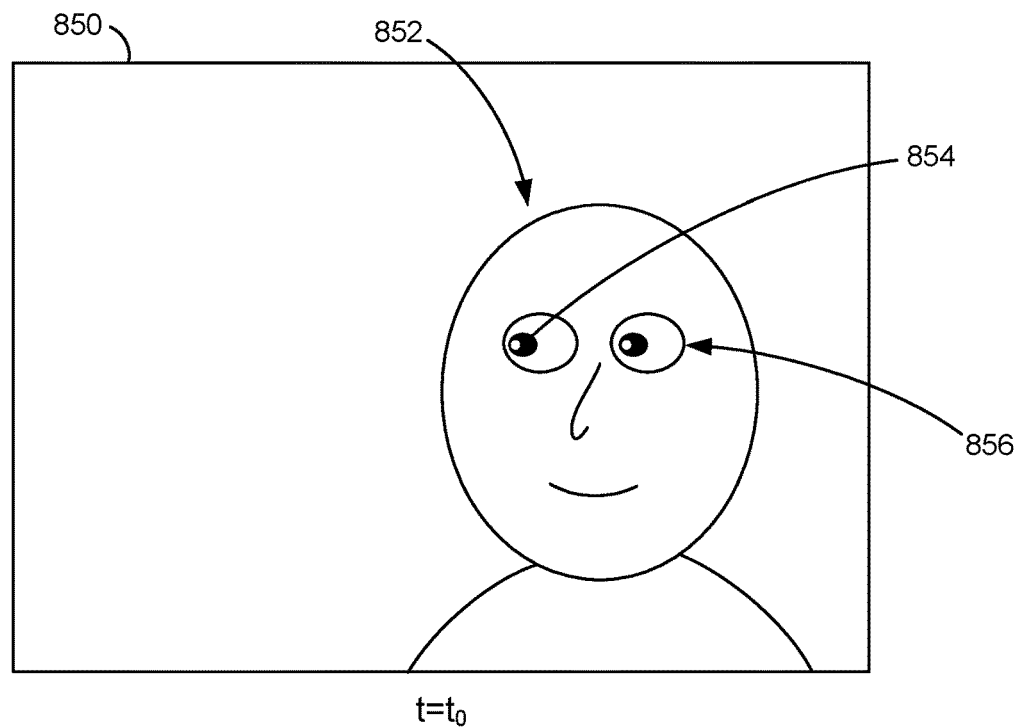
FIG. 8B illustrates an image that is captured while the moving target of FIG. 8A is displayed, in accordance with some embodiments.
Figure 9B:
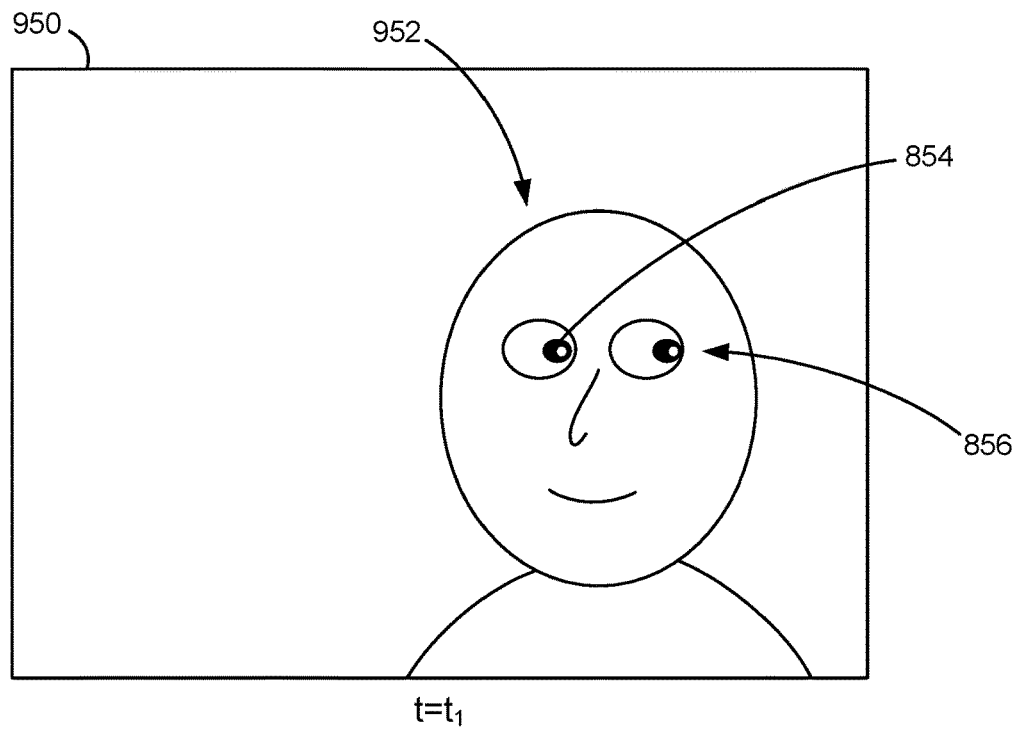
FIG. 9B illustrates an image that is captured while the moving target of FIG. 9A is displayed, in accordance with some embodiments.

FIGS. 8B and 9B illustrate captured images (850, 950) that are captured at the first time ($t_0$) and the second time ($t_1$), respectively, while the user interface 800 is displayed. In some embodiments, the captured images 850 and 950 are frames of a video or still images captured by a camera 218. The captured images 850 and 950 include a first facial image 852 and a second facial image 952, respectively, of the person 402. In some embodiments, one or more facial features (e.g., one or more parts of one or both eyes 856, such as pupils, retinas, and/or irises 854) of the person 402 are tracked. For example, a change in the position the one or more facial features from the first image 850 to the second image 950 is determined and compared to a path of movement of the moving target 802 displayed in the user interface 800. In this way, a person 402 provides liveness verification by moving one or more facial features (e.g., changing a direction of view of the person's eyes 856) in accordance with the path of movement of the moving target 804.

Figure 10A:
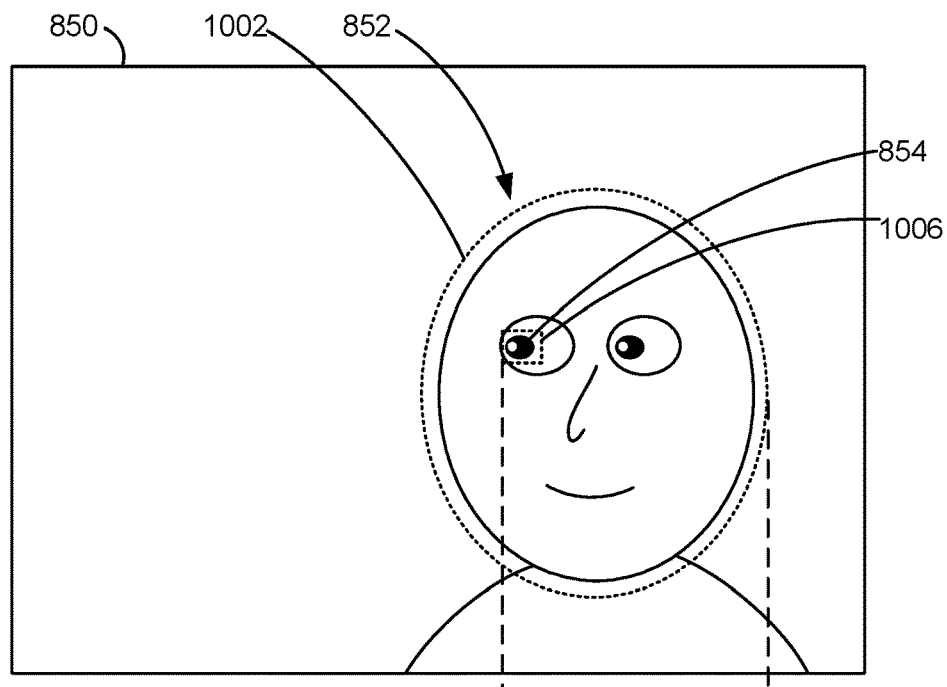
FIGS. 10A-10B illustrate movement of an eye relative to movement of a facial image while the moving target of FIGS. 8A and 9A is displayed, in accordance with some embodiments.
Figure 10B:
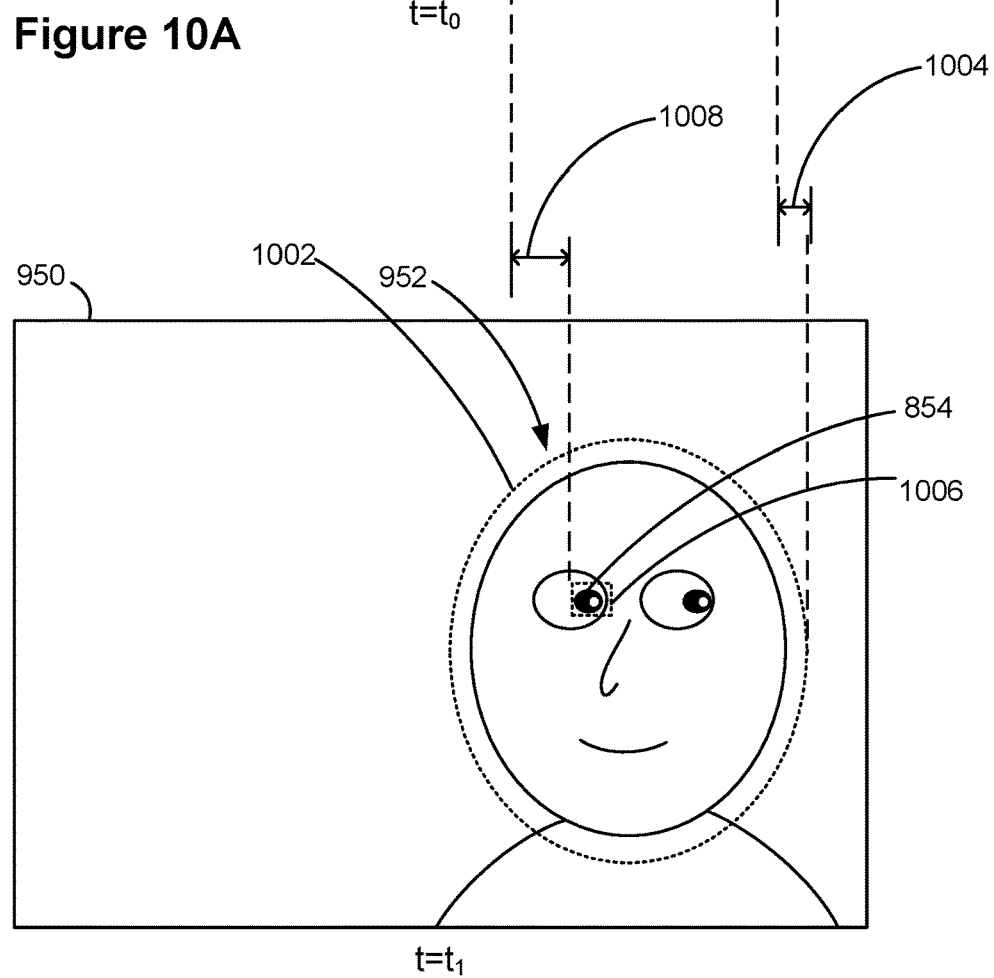

In some embodiments, to meet the movement criteria for a liveness assessment, movement of a facial feature must exceed a threshold distance (e.g., relative to movement of a boundary of the person's face). FIGS. 10A-10B illustrate movement of an eye (specifically, the iris 854) relative to movement of a facial image 852 of a person 402. For example, the eye movement illustrated in FIGS. 10A-10B occurs as the user interface 800 displays a moving target 802, as illustrated in FIGS. 8A and 9A. FIG. 10A illustrates the first image 850 (also shown in FIG. 8B) including the first facial image 852 of the person 402 at the first time ($t_0$). A facial border 1002 corresponds to the outline of the first facial image 852 (e.g., as determined using an image processing technique, such as edge detection). FIG. 10B illustrates the second image 950 (also shown in FIG. 9B) including the second facial image 952 of the person 402 at the second time (O. The face of person 402 has moved in the time between $t_0$ and $t_1$, by an amount illustrated by the facial border movement distance 1004. In some embodiments, to satisfy the movement criteria for a liveness assessment, movement of the iris 854 (or movement of a determined iris border 1006 that corresponds to the iris 854), as illustrated by the iris movement distance 1008, must exceed movement of facial border 1002 (e.g., by at least a threshold amount).

Figure 11A:
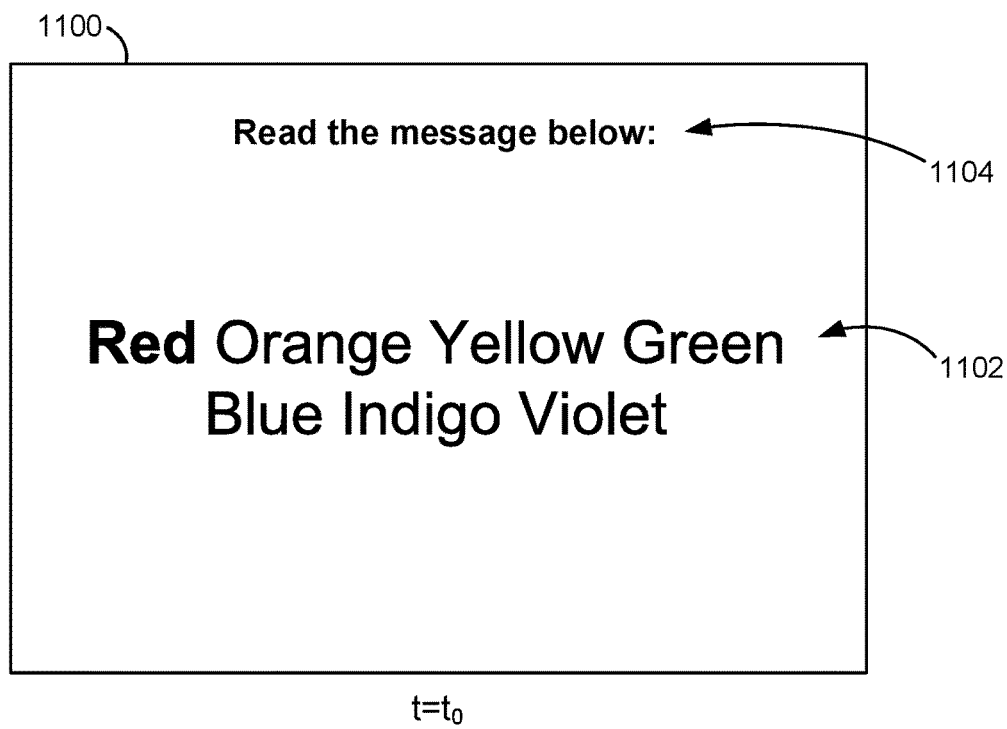
FIG. 11A illustrates a first state of a user interface that displays language content for liveness verification, in accordance with some embodiments.
Figure 12A:
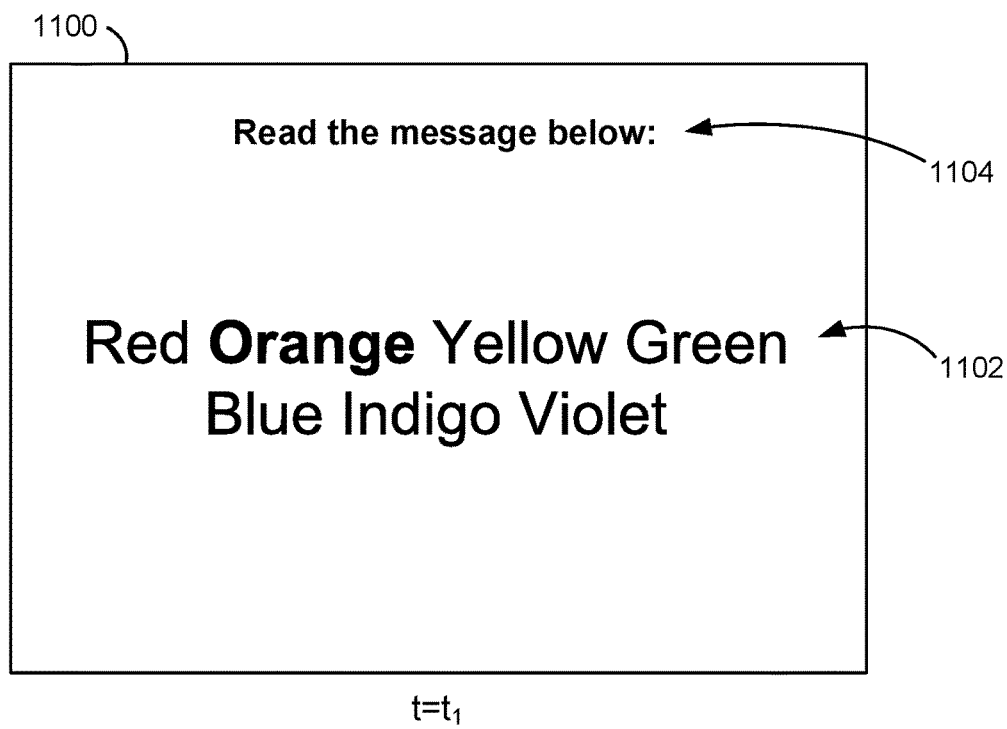
FIG. 12A illustrates a second state of a user interface that displays language content for liveness verification, in accordance with some embodiments.

FIGS. 11A and 12A illustrate a user interface 1100 that displays language content 1102 for liveness verification, in accordance with some embodiments. FIG. 11A illustrates a first state of a user interface 1100 that is displayed at a first time ($t_0$) and FIG. 12A illustrates a second state of the user interface 1100 as displayed at a second time ($t_1$), which is later than the first time. The user interface 1100 is displayed by a display (e.g., an output device 232) of an image capturing device 200 (e.g., 200a or 200b). In some embodiments, the language content 1102 is a word, a set of words (e.g., a phrase and/or a sentence), a set of sentences, a letter, a set of letters, a gibberish word, and/or a set of gibberish words. In some embodiments, the language content 1102 is predetermined language content, randomly generated language content, and/or pseudorandomly generated language content. In some embodiments, the language content 1102 is cyclically, randomly, and/or pseudorandomly selected from a set of predetermined language content items. In some embodiments, respective words in a set of words are sequentially highlighted (e.g., shown with a visually distinguishing feature such as a size, font, bolding, italicizing, and/or underlining that distinguishes the respective word from other words) in order to indicate at a particular time that the person 402 is to read a respective word from the language content 1102. In some embodiments, the user interface 1100 displays or outputs by an audio output a prompt (e.g., instructive text 1104) to provide instructions to a user (e.g., the person 402) for speaking language content 1102 that is displayed or otherwise output.

Figure 11B:
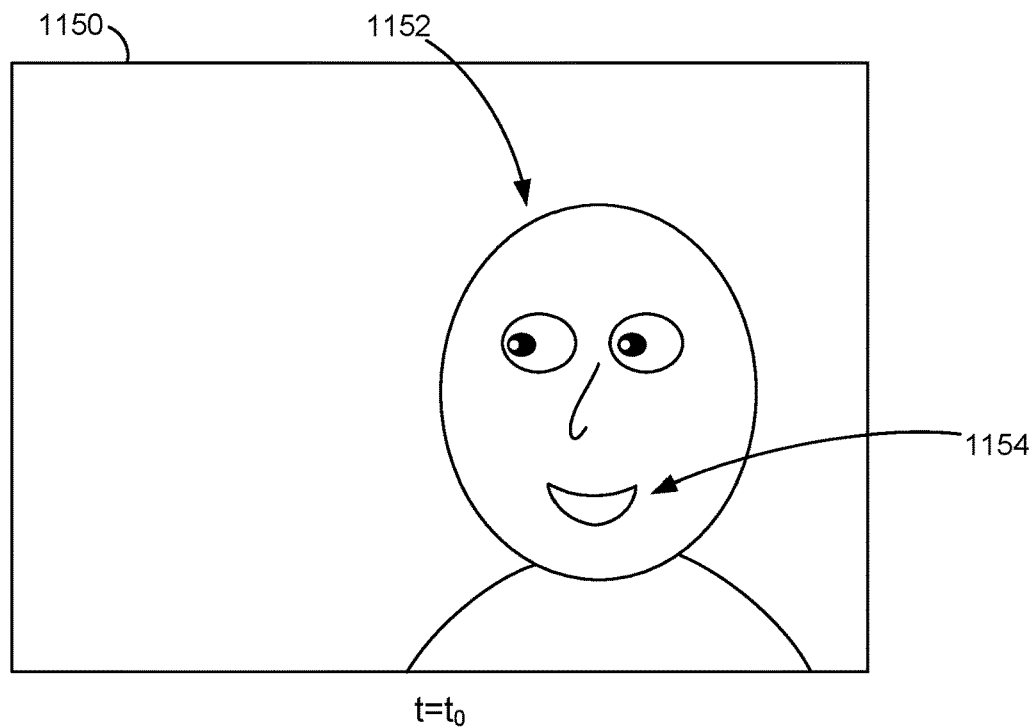
FIG. 11B illustrates an image that is captured while the language content of FIG. 11A displayed, in accordance with some embodiments.
Figure 12B:
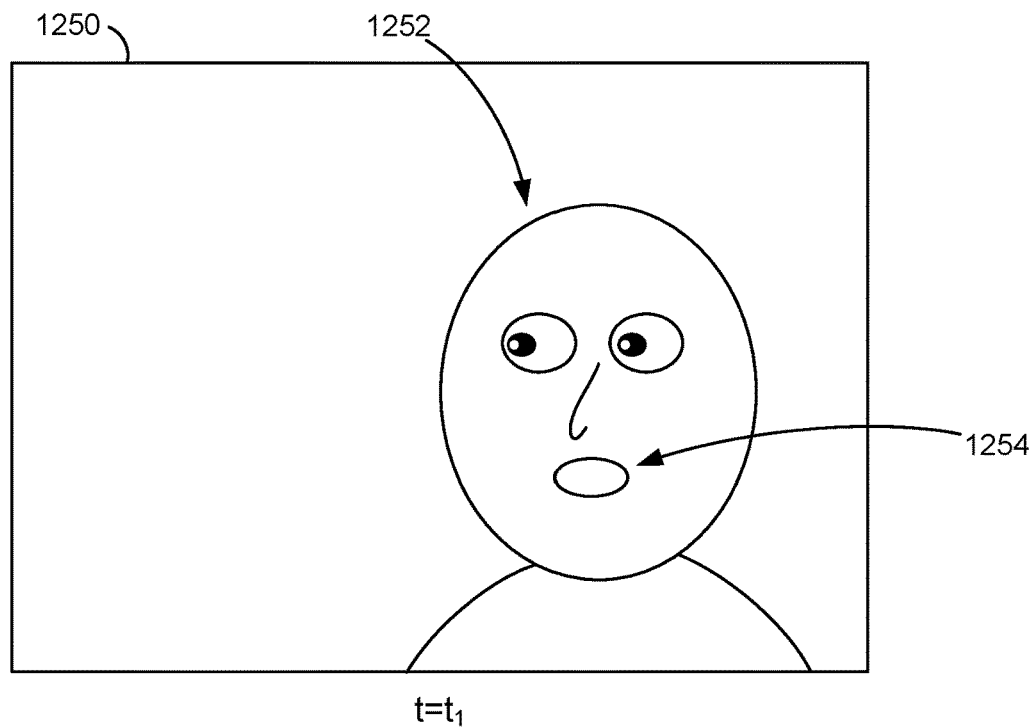
FIG. 12B illustrates an image that is captured while the language content of FIG. 12A displayed, in accordance with some embodiments.
Figure 13A:
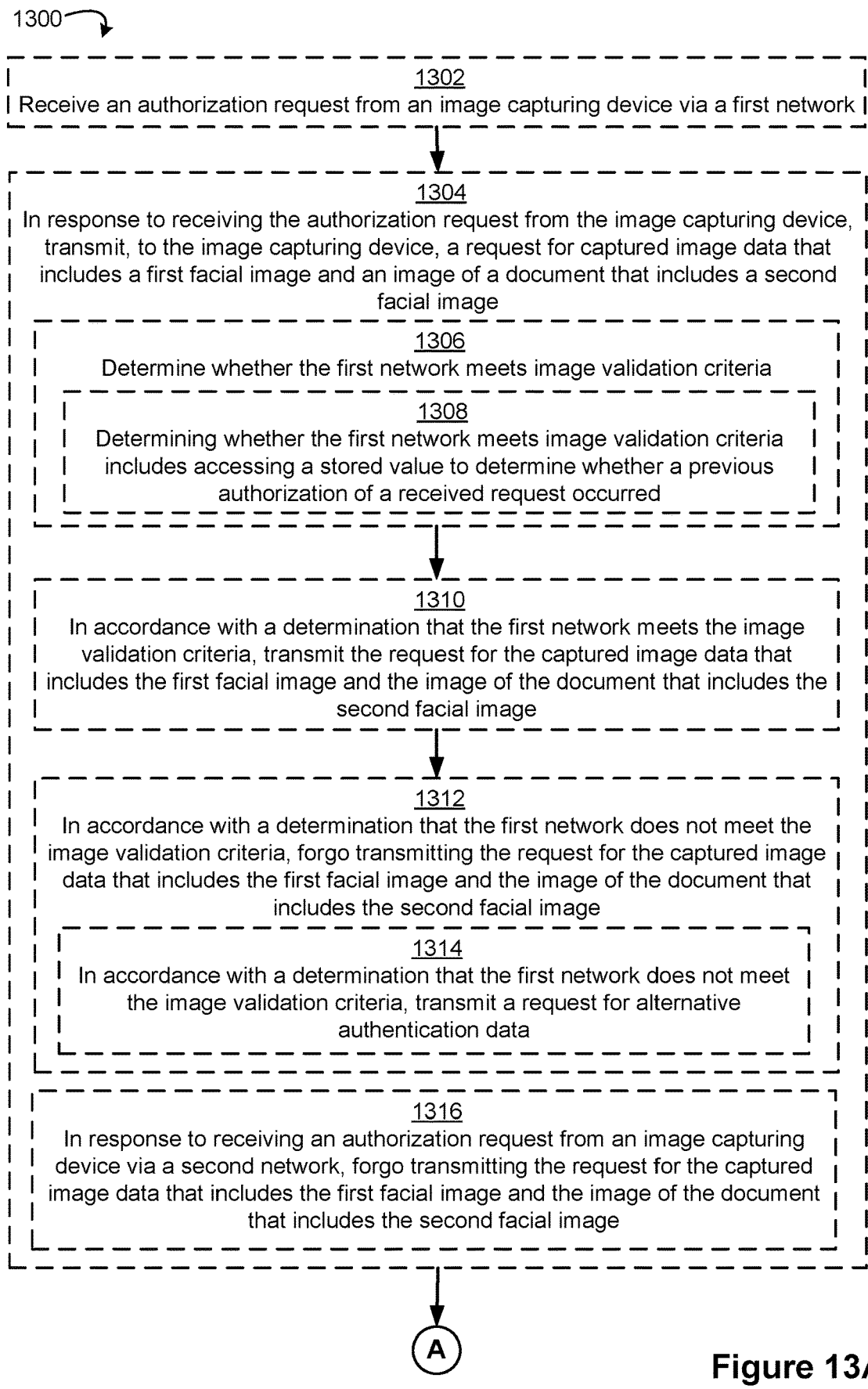
Figure 13D:
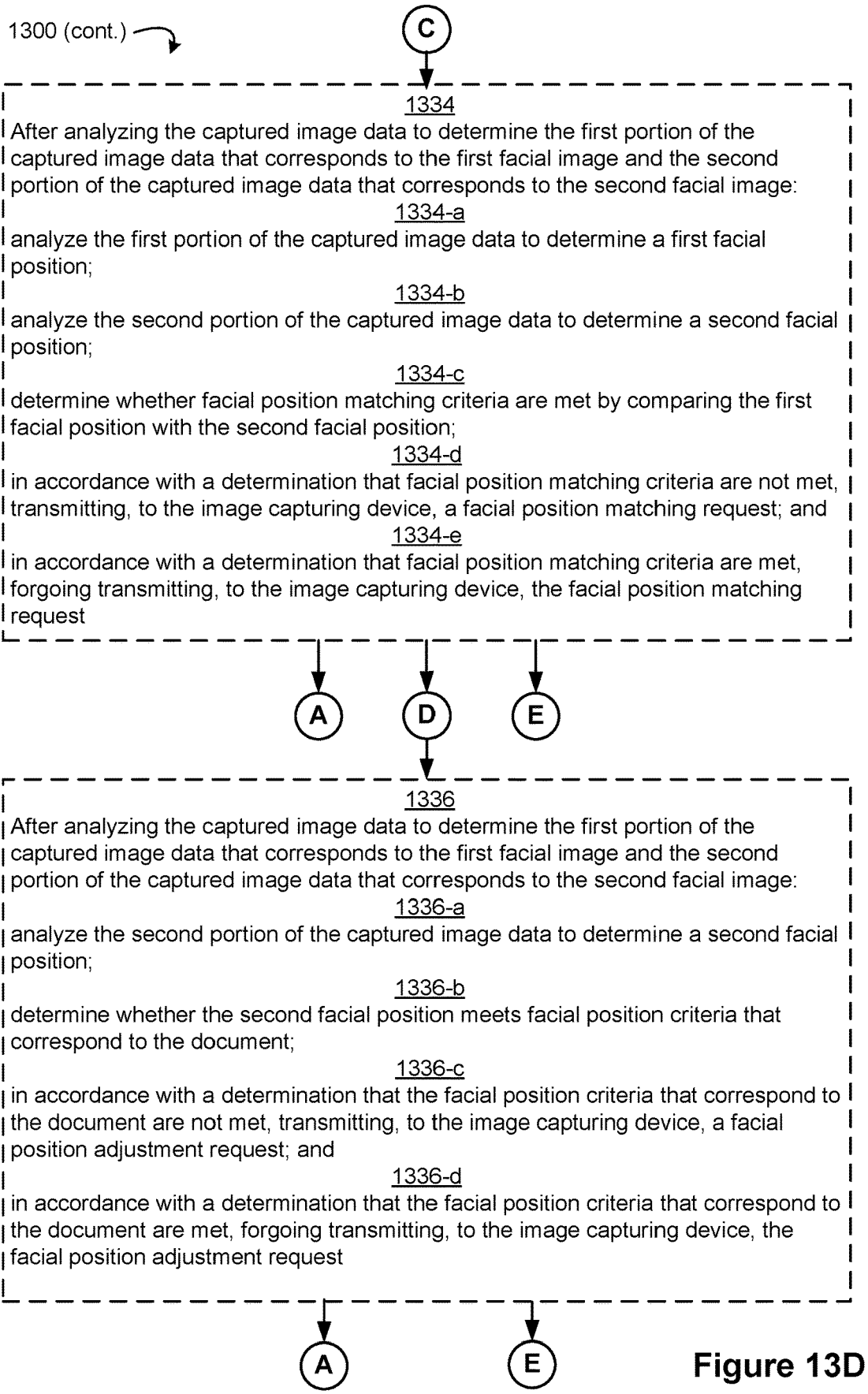
Figure 13F:
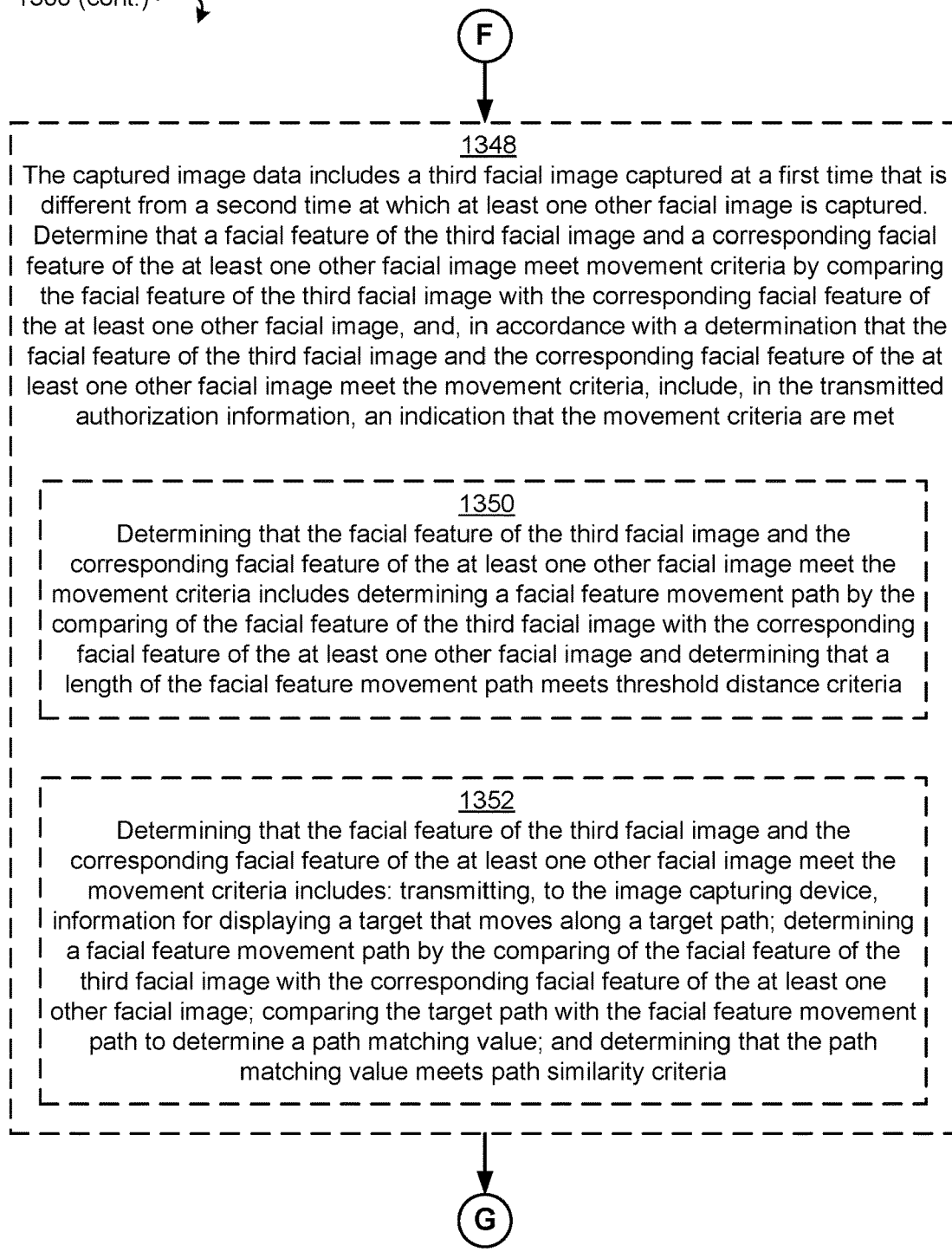
Figure 13G:
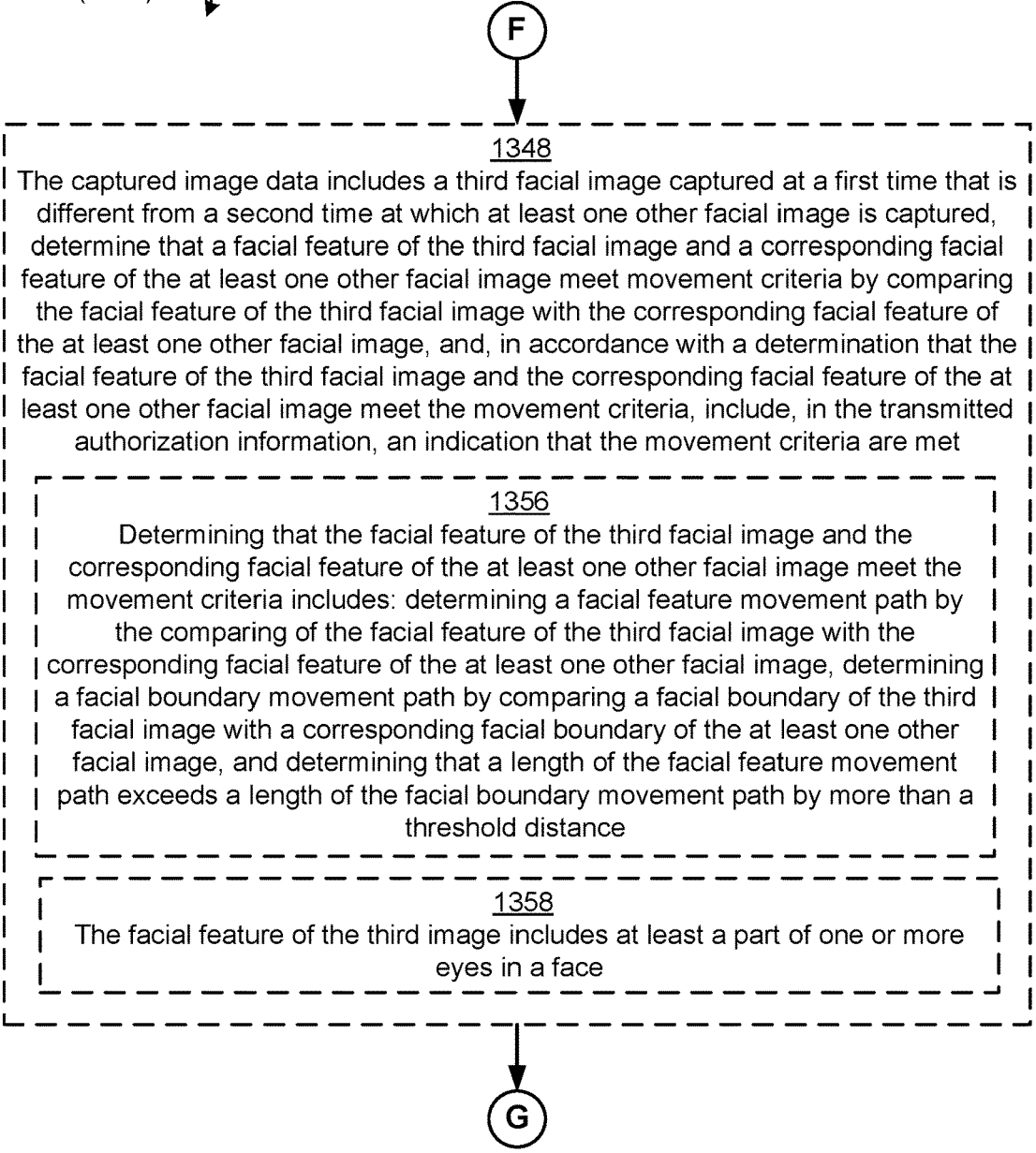
Figure 13H:
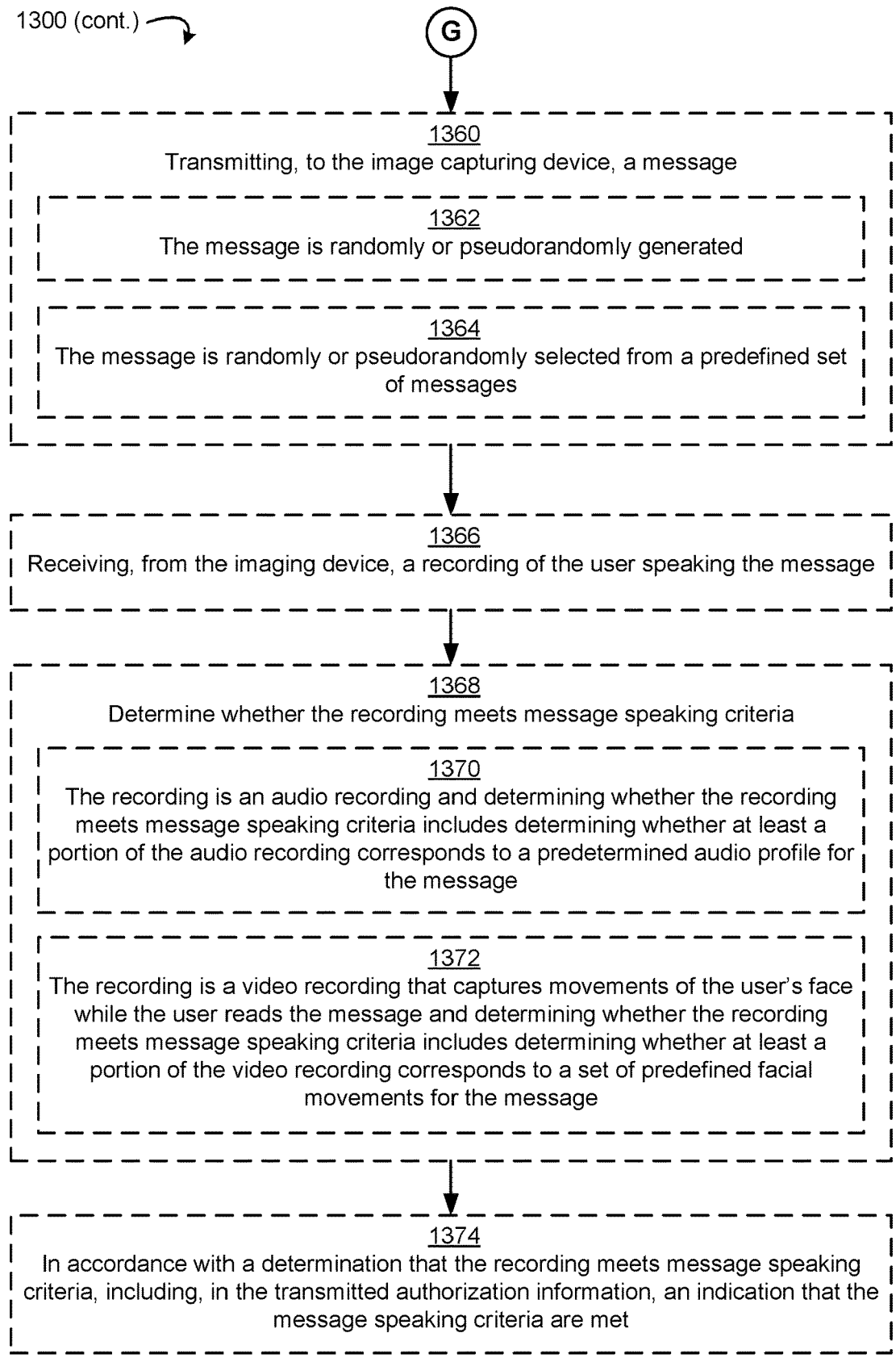

FIGS. 11B and 12B illustrate captured images 1150 and 1250, which are captured at the first time ($t_0$) and the second time ($t_1$), respectively, while the user interface 1100 is displayed. In some embodiments, the captured images 1150 and 1250 are frames of a video or still images captured by a camera 218. The captured images 1150 and 1250 include facial images 1152 and 1252, respectively, of the person 402. In some embodiments, a position of the mouth 1154 within facial image 1152 and/or a position of the mouth 1254 within the facial image 1252 is determined. One or more mouth shape parameters (e.g., an extent to which the mouth is open and/or a roundness of the mouth shape) in one or more captured images (e.g., 1150 and 1250) is determined and compared with one or more mouth shapes that correspond to the displayed language content 1102. The person 402 provides liveness verification by speaking in response to displayed or otherwise output language content 1102. As the message is spoken, the person's mouth makes mouth shapes that correspond to stored mouth shape information.

FIGS. 13A-13H are flow diagrams illustrating a method 1300 for authenticating a user using facial image comparison, in accordance with some embodiments. The method 1300 is performed at a device, such as a computing system 100. For example, instructions for performing the method 1300 are stored in the memory 102 and executed by the processor(s) 120 of the computing system 100. In FIGS. 13A-13H, dotted outlines indicate optional operations.

In some embodiments, prior to receiving a captured image, the device receives (1302) an authorization request from an image capturing device 200 via a first network 150. For example, the authorization request is an access request (such as a data access request, a device access request, and/or a facility access request) and/or a request to conduct a transaction.

In some embodiments, in response to receiving the authorization request from the image capturing device 200, the device transmits (1304), to the image capturing device 200, a request for captured image data that includes a first facial image 602 and an image of a document 300 that includes a second facial image 302.

In some embodiments, the device determines (1306) whether the first network 150 meets image validation criteria.

In some embodiments, the first network 150 is a first financial network (e.g., a network associated with a first transaction processor) or a first commercial network (e.g., a network associated with a particular facility or service provider) and a second network 152 is a second financial network (e.g., a network associated with a second transaction processor) or a second commercial network.

In some embodiments, after an authorization (e.g., for processing a transaction using a first network 150) has been granted for a particular user (e.g., as identified by the user identification information 208 transmitted from the image capturing device 200 to the computing system 100), image matching determinations are no longer required for subsequent authorizations of the user. In some embodiments, suspending image matching determinations lasts for a limited window of time (e.g., five minutes or thirty minutes). In other embodiments, suspending image matching determinations lasts indefinitely.

In some embodiments, determining whether the first network 150 meets image validation criteria includes (1308) accessing a stored value to determine whether a previous authorization of a received request occurred. For example, in some embodiments, determining whether an authorization has been granted for a particular user includes determining whether, for a previous authorization request, authorization information has been received by the imaging capturing device 200 (e.g., as described below with regard to operation 1342). If an authorization has not been granted for the particular user, the image validation criteria are met (e.g., image validation is required for the current transaction).

In some embodiments, in accordance with a determination that the first network 150 meets the image validation criteria (e.g., image validation has not been previously performed for a particular user), the device transmits (1310) the request for the captured image data that includes the first facial image 602 and the image of the document 300 that includes the second facial image 302. In some embodiments, in accordance with a determination that the first network does not meet the image validation criteria (e.g., image validation has been previously performed for the user, so no further image validation is required), the device forgoes (1312) transmitting the request for the captured image data that includes the first facial image 602 and the image of the document 300 that includes the second facial image 302.

In some embodiments, in accordance with a determination that the first network 150 does not meet the image validation criteria, the device transmits (1314) a request for alternative authentication data (e.g., username, password, and/or alternative biometric data such as fingerprint scan and/or retinal scan). For example, when it is determined that a first network 150 is not capable of performing image validation, the device requests the alternative authentication data.

In some embodiments, a second network 152 does not meet image validation criteria (e.g., the second network 152 does not support and/or require image validation).

In some embodiments, in response to receiving an authorization request from an image capturing device 200 via a second network 152, the device forgoes transmitting (1316) the request for the captured image data that includes the first facial image and the image of the document that includes the second facial image. For example, when the device determines that the second network 152 is not capable of performing image validation, the device does not request captured image data from the second network 152.

The device receives (1318), from an image capturing device 200, captured image data (e.g., an image frame 600, as illustrated in FIG. 6A) that includes a first facial image 602 and an image of a document 300 that includes a second facial image 302. The first facial image 602 and the image of the document 300 that includes the second facial image 302 are included a single image frame 600.

In some embodiments, the captured image data includes (1320) an image frame 600. In some embodiments, the captured image data includes (1322) a video stream (and the image frame 600 is a single frame of the video stream).

In some embodiments, the image of the document 300 that includes the second facial image 302 includes (1324) second facial image location cue information (e.g., the concentric rectangles indicated at 304 of FIG. 3) and determining the second portion 606 of the captured image data that corresponds to the second facial image 302 includes determining a location of the facial image location cue information. Facial image location cue information is described further above with regard to FIG. 3. In some embodiments, the device determines the second portion 606 of the captured image data by determining an area bounded by the facial image location cue information. In some embodiments, the device determines the second portion 606 of the captured image data by determining a location of the second facial image 302 within a region indicated by the facial image location cue information.

The device analyzes the captured image data to determine (1326) a first portion 604 of the captured image data that corresponds to the first facial image 602 and a second portion 606 of the captured image data that corresponds to the second facial image 302. For example, the image analysis module 106 uses edge detection techniques to determine a region and/or outline of the first facial image 602 and the second facial image 302.

In some embodiments, analyzing the captured data to determine the first portion 604 of the captured image data that corresponds to the first facial image 602 includes determining (1328), in a plurality of image frames (e.g., image frames of a video), a respective portion of a respective image frame that corresponds to the first facial image 602. In some embodiments, analyzing the captured data to determine the first portion 604 of the captured image data that corresponds to the first facial image 602 includes (1330) generating the first portion 604 by compositing a plurality of respective portions of respective image frames from the plurality of image frames that correspond to the first facial image 602. For example, if a segment of the face in the first facial image 602 is obstructed in a first frame and a distinct segment of the face in the first facial image 602 is obstructed in a second frame, the obstructed segment of the face in the second frame can be replaced with a corresponding unobstructed segment of the face from the first frame.

In some embodiments, analyzing the captured data to determine the first portion 604 of the captured image data that corresponds to the first facial image 602 includes (1332) selecting, using the second portion 606 of the captured image data that corresponds to the second facial image 302, a respective portion of a respective image frame that corresponds to the first facial image 602. For example, the image analysis module 106 determines one or more parameters (e.g., shape of face, location of facial features such as eyes, mouth, and nose relative to one another and/or relative to an outline of the face, relative sizes of facial features, and/or distances between facial features) of the second facial image 302 and uses the one or more parameters of the second facial image 302 to identify corresponding parameters in the first facial image 602.

In some embodiments, analyzing the captured data to determine the second portion 606 of the captured image data that corresponds to the second facial image 302 includes determining, in a plurality of image frames (e.g., image frames of a video), a respective portion of a respective image frame that corresponds to the second facial image 302. In some embodiments, analyzing the captured data to determine the second portion 606 of the captured image data that corresponds to the second facial image 302 includes generating the second portion 606 by compositing a plurality of respective portions of respective image frames from the plurality of image frames that correspond to the second facial image 302. For example, if a segment of the face in the second facial image 302 is obstructed in a first frame and a distinct segment of the face in the second facial image 302 is obstructed in a second frame, the obstructed segment of the face in the second frame can be replaced with a corresponding unobstructed segment of the face from the first frame.

In some embodiments, the method 1300 proceeds from operation 1326 to optional operation 1334, as indicated at C. In some embodiments, the method 1300 proceeds from operation 1326 to optional operation 1336, as indicated at D. In some embodiments, the method 1300 proceeds from operation 1326 to operation 1338, as indicated at E.

In some embodiments, after analyzing the captured image data to determine the first portion 604 of the captured image data that corresponds to the first facial image 602 and the second portion 606 of the captured image data that corresponds to the second facial image 302, the device (1334): analyzes (1334-a) the first portion 604 of the captured image data to determine a first facial position 702 and analyzes (1334-b) the second portion 606 of the captured image data to determine a second facial position. FIG. 7A illustrates a first facial position 702 that is different from a facial position of the second facial image 302. In some embodiments, the device determines (1334-c) whether facial position matching criteria are met by comparing the first facial position 702 with the facial position of the second facial image.

In some embodiments, in accordance with a determination that facial position matching criteria are not met, the device transmits (1334-d), to the image capturing device 200, a facial position matching request, and the method 1300 proceeds from operation 1334-d to operation 1318, as indicated at A. Examples of facial position matching criteria and facial position matching requests are described with regard to FIGS. 7A and 7B.

In some embodiments, in accordance with a determination that facial position matching criteria are met, the device forgoes transmitting (1334-e), to the image capturing device 200, the facial position matching request.

In some embodiments, the method 1300 proceeds from operation 1334 to optional operation 1336, as indicated at D.

In some embodiments, the method 1300 proceeds from operation 1334 to operation 1338, as indicated at E.

In some embodiments, after analyzing the captured image data to determine the first portion 604 of the captured image data that corresponds to the first facial image 602 and the second portion 606 of the captured image data that corresponds to the second facial image 302, the device (1336): analyzes (1336-a) the second portion 606 of the captured image data to determine a facial position of the second facial image 302 and determines (1336-b) whether the second facial position meets facial position criteria that correspond to the document 300. For example, specifications for a document 300 may define facial position requirements, such as an orientation of a face in the facial image, a distance from the face to a border surrounding the facial image, an expression of the face, and/or whether accessories may be worn on the face. When a facial position requirement that corresponds to a document type of the document 300 is not met, the facial position criteria are not satisfied.

In accordance with a determination that the facial position criteria that correspond to the document 300 are not met, the device transmits (1336-c), to the image capturing device 200, a facial position adjustment request, and the method 1300 proceeds from operation 1336-c to operation 1318, as indicated at A. Examples of facial position matching criteria and facial position matching requests are described with regard to FIGS. 7A and 7B.

In accordance with a determination that the facial position criteria that correspond to the document 300 are met, the device forgoes transmitting (1336-d), to the image capturing device 200, the facial position adjustment request.

In some embodiments, the method 1300 proceeds from operation 1336 to operation 1338, as indicated at E.

The device determines (1338) whether the first facial image 602 and the second facial image 302 meet matching criteria by comparing the first portion 604 of the captured image data with the second portion 606 of the captured image data. In some embodiments, comparing the first portion 604 of the captured image data with the second portion 606 of the image data includes comparing, for example, distance, size, shape, curve features, color, and/or relative properties of one or more portions of the first image 602 and the second image 302.

In some embodiments, the image analysis module 106 determines a location of a first facial feature (e.g., a nose) within the first portion 604 of the captured image data that corresponds to the first facial image 602 and within the second portion 606 of the captured image data that corresponds to the second facial image 302. In some embodiments, the image analysis module 106 determines a location of a second facial feature (e.g., a left eye) within the first portion 604 of the captured image data and within the second portion 606 of the captured image data. A first distance between the first facial feature and the second facial feature in the first portion 604 of the captured image data is determined. A second distance between the first facial feature and the second facial feature in the second portion 606 of the captured image data is determined. The first distance (e.g., relative to the size of facial image 602 in the first portion 604) is compared with the second distance (e.g., relative to the size of the facial image 302 in the second portion 606) to determine whether the first facial image and the second facial image meet the matching criteria.

In some embodiments, the image analysis module 106 determines a location of a facial feature (e.g., an iris of at least one eye) within the first portion 604 of the captured image data that corresponds to the first facial image 602 and within the second portion 606 of the captured image data that corresponds to the second facial image 302, and compares a color of the facial feature (e.g., a color of at least one pixel) in the first portion 604 of the captured image data with the color of the facial feature in the second portion 606 of the captured image data to determine whether the first facial image 602 and the second facial image 302 meet the matching criteria.

In some embodiments, the image analysis module 106 determines a shape of a face outline within the first portion 604 of the captured image data that corresponds to the first facial image 602 and within the second portion 606 of the captured image data that corresponds to the second facial image 302, and compares the shape of the face in the first portion 604 of the captured image data with the shape of the face in the second portion 606 of the captured image data to determine whether the first facial image 602 and the second facial image 302 meet the matching criteria.

In some embodiments, in lieu of and/or in addition to facial data, the image analysis performed on the captured image data uses another identifying feature of a user, such as a torso image, a whole body image, a hand image, and/or a fingerprint image. For example, the captured image data includes a first whole body image and an image of a document that includes a second whole body image.

In some embodiments, determining whether the first facial image 602 and the second facial image 302 meet matching criteria includes (1340) at least one of: comparing the first portion 604 of the captured image data with image data that corresponds to a stored facial image or comparing the second portion 606 of the captured image data with image data that corresponds to the stored facial image. For example, the stored facial image is a reference image of the person 402 stored in the memory 102, the local authentication database 130, and/or the remote authentication database 154. The reference image is, for example, an image received by the computing system 100 prior to an authorization request or an image determined by the computing system 100 (e.g., by searching for images that correspond to user information, such as the user name) in response to receiving an authorization request.

In accordance with a determination that the first facial image 602 and the second facial image 302 meet the matching criteria, the device transmits (1342) authorization information to the image capturing device 200. The authorization information is, for example, transaction approval information, information (e.g., a cryptographic key, a uniform resource locator, a passcode, and/or a parameter value) that grants access to data, to a facility, and/or to a device.

In some embodiments, in accordance with a determination that the first facial image 602 and the second facial image 302 do not meet the matching criteria, the device transmits (1344) authorization denial information to the image capturing device 200.

In some embodiments, in accordance with a determination that the first facial image 602 and the second facial image 302 do not meet the matching criteria, the device transmits (1346), to the image capturing device, a facial position adjustment request. Examples of facial position adjustment requests are discussed above with regard to FIGS. 7A and 7B.

In some embodiments, in lieu of receiving captured image data from an image capturing device 200 that is remote from the computing system 100, the computing system 100 captures the captured image data. For example, the computing system 100 captures the captured image data using a biometric input device 128, a camera (not shown) that is a component of the computing system 100, or a local camera (not shown) that is a peripheral device of the computing system 100. In this way, the same system that captures the image data also analyzes the image data as described with regard to FIGS. 13C-13E. For example, in some embodiments, a kiosk (e.g., similar to the kiosk 200b as illustrated in FIG. 5) includes a computing system 100 with a camera that captures an image of the person 402 and the document 300.

In some embodiments, the captured image data includes (1348) a third facial image (e.g., the second facial image 952 in the second image 950) captured at a first time (e.g., $t_1$) that is different from a second time (e.g., $t_0$ or other time) at which at least one other facial image (e.g., a facial image of the person 402 in one or more of the images 600, 700, 750, or 850), is captured. In some embodiments, the device determines that a facial feature (e.g., the iris 854) of the third facial image and a corresponding facial feature of the at least one other facial image meet movement criteria by comparing the facial feature of the third facial image with the corresponding facial feature of the at least one other facial image. For example, a position of the iris 854 in the first image 850 is compared with a position of the iris 854 in the second image 950, as illustrated by the distance 1008 in FIGS. 10A-10B. In accordance with a determination that the facial feature of the third facial image and the corresponding facial feature of the at least one other facial image meet the movement criteria, the device includes, in the transmitted authorization information, an indication that the movement criteria are met. In some embodiments, the transmitted authorization information includes multiple transmissions (e.g., a first transmission, which is transmitted in accordance with a determination that the first facial image and the second facial image meet the matching criteria and a second transmission, which is distinct from the first transmission, and transmitted in accordance with a determination that the facial feature of the third facial image and the corresponding facial feature of the at least one other facial image meet the movement criteria). In some embodiments, the authorization information is transmitted in a single transmission. In some embodiments, in accordance with a determination that the facial feature of the third facial image and the corresponding facial feature of the at least one other facial image do not meet the movement criteria, the device transmits authorization denial information to the image capturing device.

In some embodiments, determining that the facial feature (e.g., the iris 854) of the third facial image (e.g., the image 952) and the corresponding facial feature of the at least one other facial image (e.g., the image 852) meet the movement criteria includes (1350) determining a facial feature movement path (e.g., as illustrated by the movement of the iris 854 in FIGS. 10A-10B) by the comparing of the facial feature of the third facial image with the corresponding facial feature of the at least one other facial image and determining that a length of the facial feature movement path meets threshold distance criteria.

In some embodiments, determining that the facial feature (e.g., the iris 854) of the third facial image (e.g., the image 952) and the corresponding facial feature of the at least one other facial image (e.g., the image 852) meet the movement criteria includes (1352) transmitting, to the image capturing device 200, information for displaying (e.g., on the display of the imaging capturing device 200, such as the output device 232), a target (e.g., a moving target 802), which moves along a target path (e.g., as illustrated by the user interface 800 as shown in FIG. 8A and FIG. 9A). A facial feature movement path is determined by comparing the facial feature of the third facial image with the corresponding facial feature of the at least one other facial image (e.g., as illustrated by movement of the iris 854 in FIGS. 10A-10B). The target path is compared with the facial feature movement path to determine whether a path matching value meets path similarity criteria. In some embodiments, in accordance with a determination that the path matching value meets the path similarity criteria, the movement criteria are met.

In some embodiments, determining that the facial feature (e.g., the iris 854) of the third facial image (e.g., the image 952) and the corresponding facial feature of the at least one other facial image (e.g., the image 852) meet the movement criteria includes (1356) determining a facial feature movement path by comparing the facial feature of the third facial image with the corresponding facial feature of the at least one other facial image (e.g., as illustrated by movement of the iris 854 in FIGS. 10A-10B). A facial boundary movement path is determined by comparing a facial boundary (e.g., the boundary 1002) of the third facial image (e.g., the image 952) with a corresponding facial boundary (e.g., the boundary 1002) of the at least one other facial image (e.g., the image 852). In some embodiments, in accordance with a determination that a length of the facial feature movement path (e.g., the path 1008) exceeds a length of the facial boundary movement path (e.g., the path 1004) by more than a threshold distance, the movement criteria are met.

In some embodiments, the facial feature of the third image includes (1358) at least a part (e.g., the iris 854) of one or more eyes 856 in a face.

In some embodiments, the device transmits (1360), to the image capturing device 200, a message (e.g., language content 1102, as shown in FIGS. 11A and 12A). For example, the message is configured for output by an output device 232 of the image capturing device 200, such as a display and/or a speaker. In some embodiments, the message is randomly or pseudorandomly generated (1362). In some embodiments, the message is randomly or pseudorandomly selected (1364) from a predefined set of messages. In some embodiments, in addition to and/or in lieu of displaying the language content 1102, the device generates an audio output of a message with the language content 1102.

The device receives (1366), from the image capturing device 200, a recording (e.g., a recording captured by the camera 218 and/or a microphone of the input device 230) of the user speaking the message.

In some embodiments, the recording is (1370) an audio recording (e.g., recorded using a microphone of the input device 230 of the image capturing device 200). In some embodiments, determining whether the recording meets message speaking criteria includes (1370) determining whether at least a portion of the audio recording corresponds to a predetermined audio profile for the message. For example, an audio matching algorithm determines whether an audio recording matches a recorded or generated audio file stored by the liveness analysis module 119 (e.g., within a predetermined tolerance).

In some embodiments, the recording is (1372) a video recording (e.g., recorded by the camera 218 of the image capturing device 200), which captures movements of the user's face while the user reads the message (e.g., a video recording that includes video frames as described with regard to FIGS. 11B and 12B). In some embodiments, determining whether the recording meets message speaking criteria includes (1372) determining whether at least a portion of the video recording (e.g., mouth shape parameters of the mouth 1254 in one or more frames of the video, as described with regard to FIGS. 11B and 12B) corresponds to a set of predefined facial movements for the message (e.g., video and/or images stored by the liveness analysis module 119). For example, the image analysis module 106 compares mouth shapes in the stored video and/or images with mouth shapes in the received recording (e.g., within a predetermined tolerance).

In some embodiments, the recording is a set of still images (e.g., captured by the camera 218 of image capturing device 200), which capture movements of the user's face while the user reads the message. In some embodiments, determining whether the recording meets message speaking criteria includes determining whether mouth shape parameters of the mouth 1254 in at least a subset of the set of still images corresponds to a set of predefined facial movements for the message. For example, the image analysis module 106 compares a shape of a mouth in one or more stored images with the shape of the mouth in one or more images from the received set of still images (e.g., within a predetermined tolerance).

In some embodiments, the device determines (1368) whether the recording meets message speaking criteria, and in accordance with a determination that the recording meets message speaking criteria, the device includes (1374), in the transmitted authorization information, an indication that the message speaking criteria are met. In some embodiments, the transmitted authorization information includes multiple transmissions (e.g., a first transmission, which is transmitted in accordance with a determination that the first facial image and the second facial image meet the matching criteria, and a second transmission, which is distinct from the first transmission. The second transmission is transmitted in accordance with a determination that the recording meets message speaking criteria). In some embodiments, the authorization information is transmitted in a single transmission. In some embodiments, in accordance with a determination that the recording does not meet message speaking criteria, the device transmits authorization denial information to the image capturing device.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 102 and the memory 202) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 102 and the memory 202 include one or more storage devices remotely located from the CPU(s) 120 and 220. The memory 102 and the memory 202, or alternatively the non-volatile memory device(s) within these memories, comprises a non-transitory computer readable storage medium.

Communication systems as referred to herein (e.g., the communication system 124 and the communication system 226) optionally communicate via wired and/or wireless communication connections. Communication systems optionally communicate with networks (e.g., the networks 150 and 152), such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A computer-implemented method, comprising:
at a computing system including one or more processors and memory storing one or more programs configured for execution by the one or more processors:
receiving, from an image capturing device, a single captured image that includes:
a first facial image of a user,
an image of a document that includes a second facial image, and
a third facial image captured at a first time that is different from a second time at which at least one other facial image is captured;
wherein the first facial image and the image of the document that includes the second facial image are included in a single image frame;
analyzing the single captured image to determine:
a first portion of the single captured image that corresponds to the first facial image, and
a second portion of the single captured image that corresponds to the second facial image;
determining whether the first facial image and the second facial image meet matching criteria by comparing the first portion of the single captured image with the second portion of the single captured image;
determining that a facial feature of the third facial image and a corresponding facial feature of the at least one other facial image meet movement criteria by comparing the facial feature of the third facial image with the corresponding facial feature of the at least one other facial image;
in accordance with a determination that the first facial image and the second facial image meet the matching criteria and in accordance with a determination that the facial feature of the third facial image and the corresponding facial feature of the at least one other facial image meet the movement criteria, transmitting authorization information to the image capturing device that includes an indication that the movement criteria are met; and
in accordance with a determination that the first facial image and the second facial image do not meet the matching criteria, transmitting, to the image capturing device, a facial position adjustment request.

2. The method of claim 1, wherein the single captured image includes a still image.

3. The method of claim 1, wherein the single captured image includes a video stream.

4. The method of claim 1, wherein analyzing the single captured image to determine the first portion of the single captured image that corresponds to the first facial image includes determining, in a plurality of image frames, a respective portion of a respective image frame that corresponds to the first facial image.

5. The method of claim 4, wherein analyzing the single captured image to determine the first portion of the single captured image that corresponds to the first facial image includes generating the first portion by compositing a plurality of respective portions of respective image frames from the plurality of image frames that correspond to the first facial image.

6. The method of claim 1, wherein analyzing the single captured image to determine the first portion of the single captured image that corresponds to the first facial image includes selecting, using the second portion of the single captured image that corresponds to the second facial image, a respective portion of a respective image frame that corresponds to the first facial image.

7. The method of claim 1, wherein:
the image of the document that includes the second facial image includes facial image location cue information; and
determining the second portion of the single captured image that corresponds to the second facial image includes determining a location of the facial image location cue information.

8. The method of claim 1, including:
after analyzing the single captured image to determine the first portion of the single captured image that corresponds to the first facial image and the second portion of the single captured image that corresponds to the second facial image:
analyzing the first portion of the single captured image to determine a first facial position;
analyzing the second portion of the single captured image to determine a second facial position;
determining whether facial position matching criteria are met by comparing the first facial position with the second facial position;
in accordance with a determination that facial position matching criteria are not met, transmitting, to the image capturing device, a facial position matching request; and
in accordance with a determination that facial position matching criteria are met, forgoing transmitting, to the image capturing device, the facial position matching request.

9. The method of claim 1, including:
after analyzing the single captured image to determine the first portion of the single captured image that corresponds to the first facial image and the second portion of the single captured image that corresponds to the second facial image:
analyzing the second portion of the single captured image to determine a second facial position;
determining whether the second facial position meets facial position criteria that correspond to the document;
in accordance with a determination that the facial position criteria that correspond to the document are not met, transmitting, to the image capturing device, the facial position adjustment request; and
in accordance with a determination that the facial position criteria that correspond to the document are met, forgoing transmitting, to the image capturing device, the facial position adjustment request.

10. The method of claim 1, wherein determining whether the first facial image and the second facial image meet matching criteria includes at least one of:
comparing the first portion of the single captured image with image data that corresponds to a stored facial image; or
comparing the second portion of the single captured image with image data that corresponds to the stored facial image.

11. The method of claim 1, including, in accordance with a determination that the first facial image and the second facial image do not meet the matching criteria, transmitting authorization denial information to the image capturing device.

12. The method of claim 1, including:
prior to receiving the single captured image that includes the first facial image and the image of the document that includes the second facial image:
receiving an authorization request from the image capturing device via a first network;
determining whether the first network meets image validation criteria;
in accordance with a determination that the first network meets the image validation criteria, transmitting a request for the single captured image that includes the first facial image and the image of the document that includes the second facial image; and
in accordance with a determination that the first network does not meet the image validation criteria, forgoing transmitting the request for the single captured image that includes the first facial image and the image of the document that includes the second facial image.

13. The method of claim 12, wherein determining whether the first network meets image validation criteria includes accessing a stored value to determine whether a previous authorization of a received request occurred.

14. The method of claim 12, including: in accordance with a determination that the first network does not meet the image validation criteria, transmitting a request for alternative authentication data.

15. The method of claim 12, including,
receiving an authorization request from the image capturing device via a second network; and
in response to receiving the authorization request from the image capturing device via the second network, forgoing transmitting the request for the single captured image that includes the first facial image and the image of the document that includes the second facial image.

16. The method of claim 1, wherein determining that the facial feature of the third facial image and the corresponding facial feature of the at least one other facial image meet the movement criteria includes:
determining a facial feature movement path by comparing the facial feature of the third facial image with the corresponding facial feature of the at least one other facial image; and
determining that a length of the facial feature movement path meets threshold distance criteria.

17. The method of claim 1, wherein determining that the facial feature of the third facial image and the corresponding facial feature of the at least one other facial image meet the movement criteria includes:
transmitting, to the image capturing device, information for displaying a target that moves along a target path;
determining a facial feature movement path by comparing the facial feature of the third facial image with the corresponding facial feature of the at least one other facial image;
comparing the target path with the facial feature movement path to determine a path matching value; and
determining that the path matching value meets path similarity criteria.

18. The method of claim 1, wherein determining that the facial feature of the third facial image and the corresponding facial feature of the at least one other facial image meet the movement criteria includes:
determining a facial feature movement path by comparing the facial feature of the third facial image with the corresponding facial feature of the at least one other facial image;
determining a facial boundary movement path by comparing a facial boundary of the third facial image with a corresponding facial boundary of the at least one other facial image; and determining that a length of the facial feature movement path exceeds a length of the facial boundary movement path by more than a threshold distance.

19. The method of claim 1, wherein the facial feature of the third facial image includes at least a part of one or more eyes in a face.

20. The method of claim 1, further comprising:
transmitting, to the image capturing device, information for displaying a message;
receiving, from the imaging capturing device, a recording of the user speaking the message;
determining whether the recording meets message speaking criteria; and
in accordance with a determination that the recording meets message speaking criteria, including, in the transmitted authorization information, an indication that the message speaking criteria are met.

21. The method of claim 20, wherein:
the recording is an audio recording; and
determining whether the recording meets message speaking criteria includes determining whether at least a portion of the audio recording corresponds to a predetermined audio profile for the message.

22. The method of claim 20, wherein:
the recording is a video recording that captures movements of the user's face while the user reads the message; and
determining whether the recording meets message speaking criteria includes determining whether at least a portion of the video recording corresponds to a set of predefined facial movements for the message.

23. The method of claim 20, wherein the message is randomly or pseudorandomly generated.

24. The method of claim 20, wherein the message is randomly or pseudorandomly selected from a predefined set of messages.

25. A system, comprising:
one or more processors;
memory; and
one or more programs, wherein the one or more programs are stored in the memory and are configured for execution by the one or more processors, the one or more programs including instructions for:
receiving, from an image capturing device, a single captured image that includes:
a first facial image of a user,
an image of a document that includes a second facial image, and
a third facial image captured at a first time that is different from a second time at which at least one other facial image is captured;
wherein the first facial image and the image of the document that includes the second facial image are included in a single image frame;
analyzing the single captured image to determine:
a first portion of the single captured image that corresponds to the first facial image, and
a second portion of the single captured image that corresponds to the second facial image;
determining that a facial feature of the third facial image and a corresponding facial feature of the at least one other facial image meet movement criteria by comparing the facial feature of the third facial image with the corresponding facial feature of the at least one other facial image;
in accordance with a determination that the first facial image and the second facial image meet the matching criteria and in accordance with a determination that the facial feature of the third facial image and the corresponding facial feature of the at least one other facial image meet the movement criteria, transmitting authorization information to the image capturing device that includes an indication that the movement criteria are met; and
in accordance with a determination that the first facial image and the second facial image do not meet the matching criteria, transmitting, to the image capturing device, a facial position adjustment request.

26. The system of claim 25, wherein the one or more programs include instructions for, in accordance with a determination that the first facial image and the second facial image do not meet the matching criteria, transmitting authorization denial information to the image capturing device.

27. A non-transitory computer readable storage medium storing one or more programs, the one or more programs comprising instructions, which when executed, cause a device to:
receive, from an image capturing device, a single captured image that includes:
a first facial image of a user,
an image of a document that includes a second facial image, and
a third facial image captured at a first time that is different from a second time at which at least one other facial image is captured;
wherein the first facial image and the image of the document that includes the second facial image are included in a single image frame;
analyze the single captured image to determine:
a first portion of the single captured image that corresponds to the first facial image, and
a second portion of the single captured image that corresponds to the second facial image;
determine that a facial feature of the third facial image and a corresponding facial feature of the at least one other facial image meet movement criteria by comparing the facial feature of the third facial image with the corresponding facial feature of the at least one other facial image;
in accordance with a determination that the first facial image and the second facial image meet the matching criteria and in accordance with a determination that the facial feature of the third facial image and the corresponding facial feature of the at least one other facial image meet the movement criteria, transmit authorization information to the image capturing device that includes an indication that the movement criteria are met; and
in accordance with a determination that the first facial image and the second facial image do not meet the matching criteria, transmit, to the image capturing device, a facial position adjustment request.

28. A computer-implemented method, comprising:
at a computing system including one or more processors and memory storing one or more programs configured for execution by the one or more processors:
receiving, from an image capturing device, a single captured image that includes both:
a first facial image of a user, and
an image of a document that includes a second facial image,
wherein the first facial image and the image of the document that includes the second facial image are included in a single image frame;

analyzing the single captured image to determine:
a first portion of the single captured image that corresponds to the first facial image, and
a second portion of the single captured image that corresponds to the second facial image;
after analyzing the single captured image to determine the first portion of the single captured image that corresponds to the first facial image and the second portion of the single captured image that corresponds to the second facial image:
analyzing the first portion of the single captured image to determine a first facial position;
analyzing the second portion of the single captured image to determine a second facial position;
determining whether facial position matching criteria are met by comparing the first facial position with the second facial position;
in accordance with a determination that facial position matching criteria are not met, transmitting, to the image capturing device, a facial position matching request; and
in accordance with a determination that facial position matching criteria are met, forgoing transmitting, to the image capturing device, the facial position matching request;
determining whether the first facial image and the second facial image meet matching criteria by comparing the first portion of the single captured image with the second portion of the single captured image;
in accordance with a determination that the first facial image and the second facial image meet the matching criteria, transmitting authorization information to the image capturing device; and
in accordance with a determination that the first facial image and the second facial image do not meet the matching criteria, transmitting, to the image capturing device, a facial position adjustment request.

29. A system, comprising:
one or more processors;
memory; and
one or more programs, wherein the one or more programs are stored in the memory and are configured for execution by the one or more processors, the one or more programs including instructions for:
receiving, from an image capturing device, a single captured image that includes both:
a first facial image, and
an image of a document that includes a second facial image,
wherein the first facial image and the image of the document that includes the second facial image are included in a single image frame;
analyzing the single captured image to determine:
a first portion of the single captured image that corresponds to the first facial image, and
a second portion of the single captured image that corresponds to the second facial image;
after analyzing the single captured image to determine the first portion of the single captured image that corresponds to the first facial image and the second portion of the single captured image that corresponds to the second facial image:
analyzing the first portion of the single captured image to determine a first facial position;
analyzing the second portion of the single captured image to determine a second facial position;
determining whether facial position matching criteria are met by comparing the first facial position with the second facial position;
in accordance with a determination that facial position matching criteria are not met, transmitting, to the image capturing device, a facial position matching request; and
in accordance with a determination that facial position matching criteria are met, forgoing transmitting, to the image capturing device, the facial position matching request;
determining whether the first facial image and the second facial image meet matching criteria by comparing the first portion of the single captured image with the second portion of the single captured image;
in accordance with a determination that the first facial image and the second facial image meet the matching criteria, transmitting authorization information to the image capturing device; and
in accordance with a determination that the first facial image and the second facial image do not meet the matching criteria, transmitting, to the image capturing device, a facial position adjustment request.

30. A non-transitory computer readable storage medium storing one or more programs, the one or more programs comprising instructions, which when executed, cause a device to:
receive, from an image capturing device, a single captured image that includes both:
a first facial image, and
an image of a document that includes a second facial image,
wherein the first facial image and the image of the document that includes the second facial image are included in a single image frame;
analyze the single captured image to determine:
a first portion of the single captured image that corresponds to the first facial image, and
a second portion of the single captured image that corresponds to the second facial image;
after analyzing the single captured image to determine the first portion of the single captured image that corresponds to the first facial image and the second portion of the single captured image that corresponds to the second facial image:
analyze the first portion of the single captured image to determine a first facial position;
analyze the second portion of the single captured image to determine a second facial position;
determine whether facial position matching criteria are met by comparing the first facial position with the second facial position;
in accordance with a determination that facial position matching criteria are not met, transmit, to the image capturing device, a facial position matching request; and
in accordance with a determination that facial position matching criteria are met, forgoing transmit, to the image capturing device, the facial position matching request;
determine whether the first facial image and the second facial image meet matching criteria by comparing the first portion of the single captured image with the second portion of the single captured image; and in accordance with a determination that the first facial image and the second facial image meet the matching criteria, transmit authorization information to the image capturing device; and in accordance with a determination that the first facial image and the second facial image do not meet the matching criteria, transmit, to the image capturing device, a facial position adjustment request.

* * * * *

UNITED STATES PATENT AND TRADEMARK OFFICE
CERTIFICATE OF CORRECTION

PATENT NO. : 10,606,993 B2
APPLICATION NO. : 15/673324
DATED : March 31, 2020
INVENTOR(S) : Hochrieser et al.

Page 1 of 1

It is certified that error appears in the above-identified patent and that said Letters Patent is hereby corrected as shown below:

On the Title Page

(57) ABSTRACT, Line 7, please delete "included a single" and insert --included in a single--.

Signed and Sealed this
Fourteenth Day of July, 2020

Andrei Iancu
*Director of the United States Patent and Trademark Office*